US00RE40543E

(19) United States
(12) Reissued Patent
Aoki et al.

(10) Patent Number: US RE40,543 E
(45) Date of Reissued Patent: Oct. 21, 2008

(54) METHOD AND DEVICE FOR AUTOMATIC MUSIC COMPOSITION EMPLOYING MUSIC TEMPLATE INFORMATION

(75) Inventors: Eiichiro Aoki, Hamamatsu (JP); Toshio Sugiura, Hamamatsu (JP)

(73) Assignee: Yamaha Corporation, Hamamatsu-Shi (JP)

(21) Appl. No.: 09/543,367
(22) Filed: Apr. 4, 2000

Related U.S. Patent Documents

Reissue of:
(64) Patent No.: 5,736,663
Issued: Apr. 7, 1998
Appl. No.: 08/693,462
Filed: Aug. 7, 1996

(30) Foreign Application Priority Data

Aug. 7, 1995 (JP) ..... 7-221051

(51) Int. Cl.
*B63H 5/00* (2006.01)
*G04B 13/00* (2006.01)
*G10H 7/00* (2006.01)

(52) U.S. Cl. ..... 84/609
(58) Field of Classification Search ..... 84/600, 84/609, 634
See application file for complete search history.

(56) References Cited

U.S. PATENT DOCUMENTS

| | | | | | |
|---|---|---|---|---|---|
| 4,731,847 | A | * | 3/1988 | Lybrook et al. | 704/260 |
| 4,926,737 | A | * | 5/1990 | Minamitaka | 84/611 |
| 5,208,416 | A | * | 5/1993 | Hayakawa et al. | 84/634 |
| 5,375,501 | A | * | 12/1994 | Okuda | 84/611 |
| 5,453,569 | A | * | 9/1995 | Saito et al. | 84/609 |

FOREIGN PATENT DOCUMENTS

| | | | |
|---|---|---|---|
| JP | 60-107079 | * | 6/1985 |
| JP | 63-250696 | * | 10/1988 |
| JP | 63-286883 | * | 11/1988 |
| JP | 63-311395 | * | 12/1988 |
| JP | 1-167882 A | * | 3/1989 |
| JP | 1-167783 | * | 7/1989 |
| JP | 1-167882 | * | 7/1989 |
| JP | 3-119381 | * | 5/1991 |
| JP | 4-9892 | * | 1/1992 |
| JP | 4-9893 | * | 1/1992 |
| JP | 15-181473 | | 7/1993 |
| JP | 6-75576 | * | 3/1994 |
| JP | 09-062263 | * | 3/1997 |
| JP | 09-062263 A | * | 7/1997 |

* cited by examiner

*Primary Examiner*—Jeffrey Donels
(74) *Attorney, Agent, or Firm*—Morrison & Foerster LLP

(57) ABSTRACT

For each section forming a music piece, music template information is supplied which includes at least information indicative of a pitch variation tendency in the section. A plurality of already-composed music pieces are preferably analyzed to store a plurality of pieces of such music template information so that any users can select from the stored pieces of music template information. For a music piece to be composed, the user enters information indicative of a tendency relating to the number of notes, such as syllable information of desired words or scat words, in each section of the music piece. On the basis of one of the pieces of music template information supplied and the user-entered information indicative of the number-of-notes tendency (syllable information), the length and pitch of notes in each section can be determined, which permits automatic generation of music piece data. If the music template information is used with no modification, an automatically composed music piece will considerably resemble its original music piece. The user can freely modify the music template information to be used, so that a music piece different from its corresponding original music piece can be created with the user's intention reflected thereon. The music template information can be easily modified by any users having poor knowledge of composition, and the present composing technique can be easily used by everyone.

67 Claims, 17 Drawing Sheets

| MUSICAL FORM | A—B—C—C' | | | |
|---|---|---|---|---|
| MUSICAL MOTIF | RHYTHM | | PITCH | |
| GENRE : 8 BEAT | TIME | 4/4 | RANGE | A2~E4 |
| IMAGE MUSIC PIECE : ○○○ | TEMPO | =120 | KEY | Fm |
| COMPOSER : XXXXXX | SHORTEST NOTE | ♪ | | |
| MELODIC / RHYTHMIC : MELODIC | FIRST-BEAT DELAY FREQUENCY | NULL/ MEDIUM/ HIGH | | |
| | SYNCOPATION FREQUENCY | NULL/ MEDIUM/ HIGH | | |

FIG. 5

DESIRED WORDS

I left my heart in San Francisco···

FIG. 20A

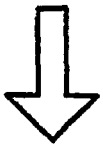

SYLLABLE INFORMATION INPUT IN SCAT FORM

D D D D – / D D DDD – /

FIG. 20B

| WHOLE | PASSAGE | A | B | C | C' |
|---|---|---|---|---|---|
| PITCH | EMOTIONAL FLUCTUATION | | | | |
| | PHRASE PITCH PATTERN (WHEN NOT SPECIFIED REFFER TO "EMOTIONAL FLUCTUATION") | | | | |
| | FIRST & LAST TONES OF PHRASE (WHEN NOT SPECIFIED REFFER TO "EMOTIONAL FLUCTUATION") | V–IV / VII–I | I–II / VII–III | I–I / VII–III | I–I / VII–VI |
| | ACTIVENESS /QUIETNESS | ACTIVE ↔ QUIET | | | |
| | CONTRAST/IMITATE | | | IMITATING FORMER HALF OF C | IMITATING LATER HALF OF C |
| RHYTHM | DENSENESS/ SPARSENESS: 1st & 2nd MEASURES | DENSE | DENSE | SPARSE / DENSE | DENSE / SPARSE |
| | DENSENESS/ SPARSENESS: 3rd & 4th MEASURES | SPARSE | SPARSE | SPARSE / DENSE | SPARSE / DENSE |
| | PHRASE HEAD DELAY (1ST BEAT) | | | PRESENT | PRESENT |
| | CONTRAST/IMITATE | | | IMITATING FORMER HALF OF C | IMITATING LATER HALF OF C |
| | SYNCOPATION | | | PRESENT | PRESENT |

FIG. 6

FIG. 7A

A [

B [

FIG. 7B

A [ ha ru o a i su ru hi to wa △ ko ko ro ki yo ki hi to △

B [ su mi re no ha na no yo u na △ bo ku no to mo da chi △

FIG. 7C

A [/ ha ru o a i su ru / hi to wa △ / ko ko ro ki yo ki hi / to △

B [/ su mi re no ha na / no yo u na △ / bo ku no to mo da / chi △

FIG. 7D

A [/ ha—ru o a i su ru / hi to wa —△ / ko—ko ro ki yo ki hi / to—△

B [/ su—mi re no ha na / no yo u na —△ / bo ku no to mo da / chi—△

FIG. 7E

A [/ ha—ru o a i su ru / hi to wa —△/ ko—ko ro ki yo ki hi / to —△

B [/ su—mi re no ha na / no yo u na —△/ bo ku no to mo da / chi —△

FIG. 7F

A [/ ha—ru o a i su ru / hi to wa—△ ko—ko ro ki yo ki hi / to —△

B [/ su—mi re no ha na / no yo u na —△ / bo ku no to mo da / chi —△

FIG. 7G

A [/ ha—ru o a i su ru / hi to wa —△/ ko—ko ro ki yo ki hi / to —△

B [/ su—mi re no ha na / no yo u na —△/ bo ku no to mo da / chi —△

FIG. 8A WORDS MEMORY

| AD | WO | AC | IN | CL |
|---|---|---|---|---|
| 1 | / | / | / | / |
| 2 | ha | 1 | H | |
| 3 | — | 0 | | |
| 4 | ru | 0 | M | |
| 5 | o | 0 | L | |
| 6 | a | 1 | L | |
| 7 | i | 0 | M | |
| 8 | su | 0 | M | |
| 9 | ru | 0 | L | |
| 10 | / | / | / | / |
| 11 | hi | 1 | L | |
| 12 | to | 0 | M | |
| 13 | wa | 0 | M | |
| 14 | — | 0 | | |
| 15 | / | / | / | / |
| 16 | △ | / | / | / |
| 17 | ko | 1 | H | |
| 18 | — | 0 | | |
| 19 | ko | 0 | M | |
| 20 | ro | 0 | M | |

FIG. 8B MUSIC PIECE MEMORY

| AD | WO | DU | PI | VE | VO |
|---|---|---|---|---|---|
| 1 | ha | ♩ | E4 | 5 | 5 |
| 2 | ru | ♪ | E4 | 4 | 5 |
| 3 | o | ♪ | D4 | 4 | 5 |
| 4 | a | ♪ | C4 | 5 | 5 |
| 5 | i | ♪ | C4 | 4 | 5 |
| 6 | su | ♪ | C4 | 4 | 5 |
| 7 | ru | ♪ | B3 | 4 | 5 |
| 8 | / | / | / | / | / |
| 9 | hi | ♩ | A3 | 5 | 5 |
| 10 | to | ♩ | A3 | 4 | 5 |
| 11 | wa | ♩ | A3 | 4 | 5 |
| 12 | / | / | / | / | / |
| 13 | ko | ♩ | F4 | 5 | 5 |
| 14 | ko | ♪ | F4 | 4 | 5 |
| 15 | ro | ♪ | E4 | 4 | 5 |

AD : ADDRESS
WO : WORDS
AC : ACCENT
IN : INTONATION
CL : CLIMAX
DU : DURATION
PI : PITCH
VE : VELOCITY
VO : VOLUME

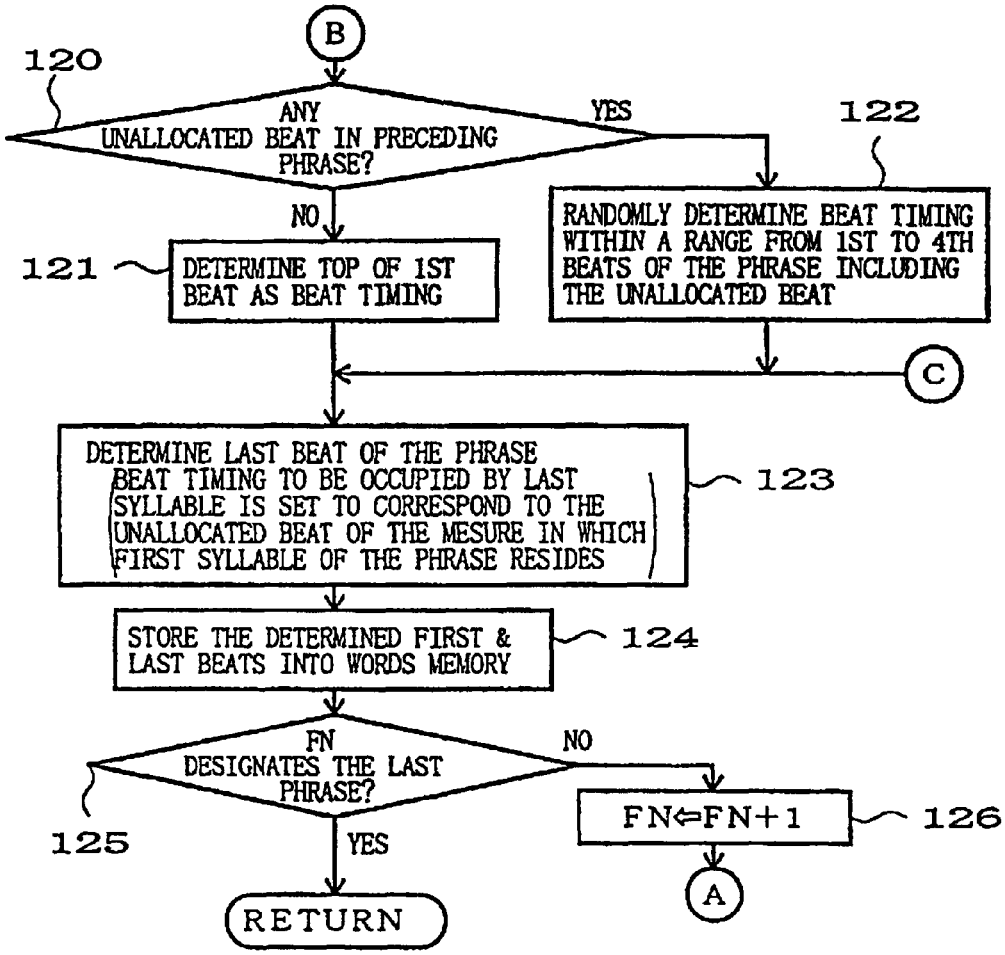

F I G. 1 2

| PHRASE | FIRST SYLLABLE | LAST SYLLABLE | TOTAL NUMBER OF MEASURES |
|---|---|---|---|
| EXAMPLE 1 : /ha—ru o a i su ru/hi to wa— | — | — | — |
| CANDIDATE 1 \|ha—ru o a i su ru \|hi to wa— \| | TOP OF 1ST BEAT | BOTTOM OF 4TH BEAT | 2 |
| EXAMPLE 2 : ha—ru/o a i su ru /hi to wa— | — | — | — |
| CANDIDATE 1 ⟨ ⟨ ⟨ ha—ru \|o a i su ru \|hi to wa— | TOP OF 4TH BEAT | BOTTOM OF 3RD BEAT | 2 |
| CANDIDATE 2 ⟨ ⟨ ∨ ha—ru \|o a i su ru \|hi to wa— | BOTTOM OF 3RD BEAT | TOP OF 3RD BEAT | 2 |
| CANDIDATE 3 ⟨ ⟨ ha—ru \|o a i su ru \|hi to wa— | TOP OF 3RD BEAT | BOTTOM OF 2ND BEAT | 2 |

F I G. 1 3

FIG. 15A

| FREQUENCY-RELATED ITEMS | WEIGHT | 1ST BEAT | | 2ND BEAT | | 3RD BEAT | | 4TH BEAT | | 1ST BEAT | | 2ND BEAT | | 3RD BEAT | | 4TH BEAT | |
|---|---|---|---|---|---|---|---|---|---|---|---|---|---|---|---|---|---|
| | | TOP | BOTTOM | TOP | BOTTOM | TOP | BOTTOM | TOP | BOTTOM | TOP | BOTTOM | TOP | BOTTOM | TOP | BOTTOM | TOP | BOTTOM |
| MORE-IMPORTANCE-TO-BEAT | 1 | 8 | 4 | 6 | 2 | 7 | 3 | 5 | 1 | 8 | 4 | 6 | 2 | 7 | 3 | 5 | 1 |
| DENSENESS/SPARSENESS | 4 | 1 | 1 | 1 | 1 | | | | | 1 | 1 | 1 | 1 | | | | |
| CONTRAST/IMITATE | 4 | | | | | | | | | | | | | | | | |
| TOTAL FREQUENCY | | 12 | 8 | 10 | 6 | 7 | 3 | 5 | 1 | 12 | 8 | 10 | 6 | 7 | 3 | 5 | 1 |
| MEASURE-BY-MEASURE PRIORITY | | 1 | 3 | 2 | 5 | 4 | 7 | 6 | 8 | 1 | 3 | 2 | 5 | 4 | 7 | 6 | 8 |

NUMBER OF SYLLABLES = 7 + 3

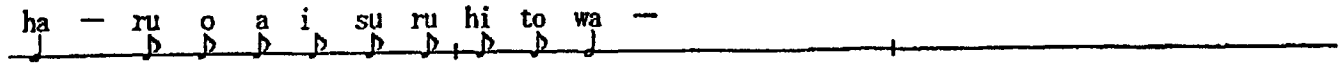

FIG. 15B

| FREQUENCY-RELATED ITEMS | WEIGHT | 1ST BEAT | | 2ND BEAT | | 3RD BEAT | | 4TH BEAT | | 1ST BEAT | | 2ND BEAT | | 3RD BEAT | | 4TH BEAT | | 1ST BEAT | | 2ND BEAT | | 3RD BEAT | | 4TH BEAT | |
|---|---|---|---|---|---|---|---|---|---|---|---|---|---|---|---|---|---|---|---|---|---|---|---|---|---|
| | | TOP | BOTTOM | TOP | BOTTOM | TOP | BOTTOM | TOP | BOTTOM | TOP | BOTTOM | TOP | BOTTOM | TOP | BOTTOM | TOP | BOTTOM | TOP | BOTTOM | TOP | BOTTOM | TOP | BOTTOM | TOP | BOTTOM |
| MORE-IMPORTANCE-TO-BEAT | 1 | | | | | 7 | 3 | 5 | 1 | 8 | 4 | 6 | 2 | 7 | 3 | 5 | 1 | 8 | 4 | 6 | 2 | | | | |
| DENSENESS/SPARSENESS | 4 | | | | | | | | | 1 | 1 | 1 | 1 | | | | | 1 | 1 | 1 | 1 | | | | |
| CONTRAST/IMITATE | 4 | | | | | | | | | | | | | | | | | | | | | | | | |
| TOTAL FREQUENCY | | | | | | 7 | 3 | 5 | 1 | 12 | 8 | 10 | 6 | 7 | 3 | 5 | 1 | 12 | 8 | 10 | 6 | | | | |
| MEASURE-BY-MEASURE PRIORITY | | | | | | 1 | 3 | 2 | 4 | 1 | 3 | 2 | 5 | 4 | 7 | 6 | 8 | 1 | 3 | 2 | 4 | | | | |

NUMBER OF SYLLABLES = 2 + 5 + 3

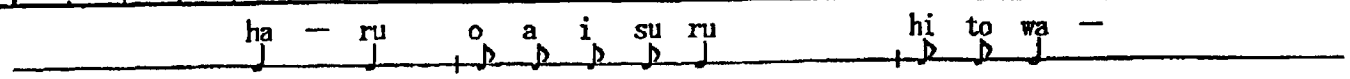

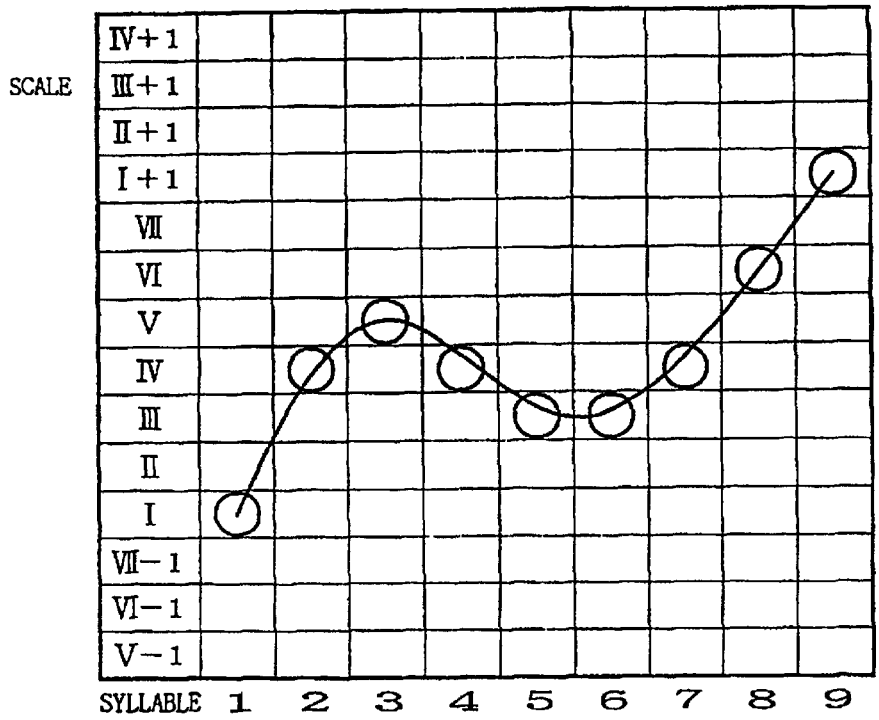
FIG. 18
FIG. 19(A)
FIG. 19(B)
FIG. 19(C)
FIG. 19(D)
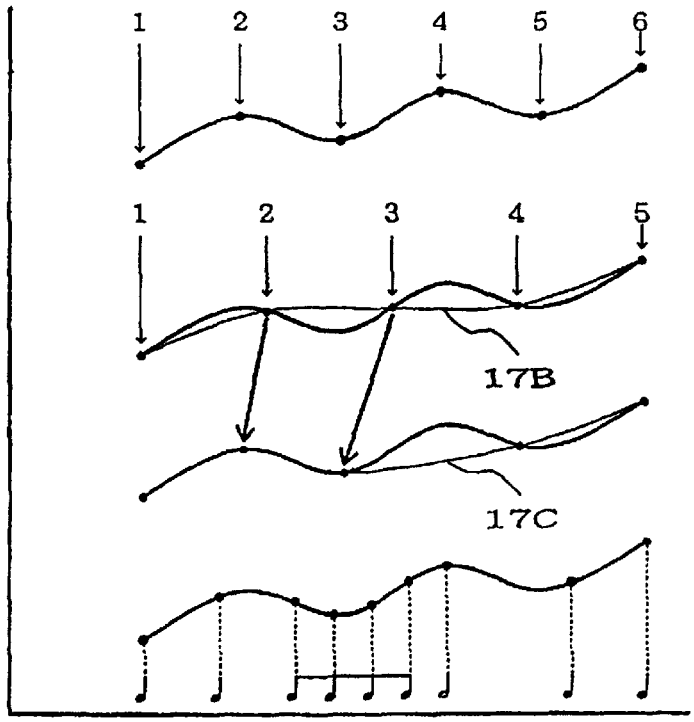

METHOD AND DEVICE FOR AUTOMATIC MUSIC COMPOSITION EMPLOYING MUSIC TEMPLATE INFORMATION

Matter enclosed in heavy brackets [ ] appears in the original patent but forms no part of this reissue specification; matter printed in italics indicates the additions made by reissue.

BACKGROUND OF THE INVENTION

The present invention relates to a method and device for automatically composing a piece of music in accordance with various musical conditions.

With a widespread use of personal computers, everyone has now come to be able to freely enjoy various types of music through the "computer music" technique, which uses a computer to play a musical instrument, compose a piece of music (music piece), arrange a composed music piece and synthesize to a tone color. Particularly, in the field of music composition using a computer, even people without expert knowledge of music can compose easily by just entering and setting various musical conditions as directed by the computer. In addition, automatic music composing devices have recently been proposed which analyze characteristics of a melody to an original music piece by classifying the melody into harmonic and non-harmonic tones and further classifying the non-harmonic tones. The proposed automatic music composing devices then synthesize a new melody in accordance with the analysis results and chord progression to thereby automatically compose a music piece.

For example, Japanese Patent Laid-open Publications Nos. SHO-63-311395, SHO-63-250696 and HEI-1-167783 disclose automatic composing techniques which take non-harmonic tones into account as mentioned above. Further, in U.S. Pat. No. 4,926,737, there is disclosed a technique which extracts characteristic parameters out of a motif melody and creates a new melody on the basis of the thus-extracted parameters. In addition, Japanese Patent Laid-Open Publication No. HEI-3119381 teaches an automatic composing technique which analyzes time series forming a melody of an original music piece so as to calculate linear predictive coefficients and create a new melody on the basis of the calculated linear predictive coefficients. Furthermore, Japanese Patent Laid-open Publication Nos. HEI-4-9892 and HEI-4-9893 disclose technique of analyzing a melody on the basis of chords and tonality in a melody. All of the prior techniques create a new melody in accordance with a given chord progression and by use of extracted characteristic parameters or analyzed data of a melody. These techniques, however, required user's special knowledge of music.

Furthermore, Japanese Patent Laid-Open Publication No. SHO-60-107079 shows a technique which prestores many kinds of note patterns (patterns of pitch variation tendency and note combination) for a single measure and selects a desired one of the prestored note patterns so as to automatically compose a music piece comprised of a plurality of measures. This technique, however, can only compose a music piece with a limited note combination (positions of individual positions within a measure) because the note combination is fixedly contained in the pattern.

Moreover, Japanese Patent Laid-open Publication No. HEI-6-75576 discloses a technique which prestores many pieces of correlative melody information, selects a desired piece of the correlative melody information for convolutional integral operations thereon so as to form melody outline information (information indicative of a time-varying pitch tendency), and automatically composes a music piece on the basis of the melody outline information. However, this publication fails to describe in detail a manner in which notes are allocated to the formed melody outline and only discloses that a music piece is created by entering musical rules.

Because the known automatic composing techniques in the filed of computer music as discussed above are merely based on such processing as to satisfy a variety of preset musical conditions (such as a chord progression, musical genre and rhythm (type), they can not perform normal composing operations hitherto done by a human being, such as first creating words and then creating music suitable for the words.

Further, in the prior art automatic music composing devices which analyze melodic characteristics of an original music piece and compose a new music piece on the basis of results of the analysis, the analysis results were used directly without being substantially modified. Even where the analysis results were modified partly, the partial modification did not mean anything more than mere random rewriting of the analysis results, due to the fact that it could not be clearly recognized how the modification acts in the course of the automatic composition. Therefore, these automatic music composing devices could not achieve automatic composition of a music piece as contemplated by an operator or user.

SUMMARY OF THE INVENTION

It is therefore an object of the present invention to provide a method and device for automatically composing a music piece which allow users, having no special musical knowledge about chord progression, to easily perform operations for the music piece composition.

It is another object of the present invention to provide a method and device which are capable of composing a music piece in such a manner that a user's intention is easily reflected in the music piece.

It is still another object of the present invention to provide a method and device which are capable of automatically composing a music piece with increased ease on the basis of words for the music piece to be composed.

In order to accomplish the objects, the present invention provides an automatic music composing device which comprises a supply section for supplying music template information including at least information indicative of a pitch variation tendency in each of a plurality of sections forming a music piece, an input section for, in response to an operation of a user, inputting information indicative of a tendency relating to the number of notes contained in each of sections of a music piece to be composed, and a determination section for determining a length and pitch of each note to be contained in each of the sections of the music piece to be composed, on the basis of the music template information and the information indicative of a pitch variation tendency in each of the sections inputted by the input section.

The above-mentioned information indicative of a pitch variation tendency in each of the sections may be that of a pitch envelope which is relatively accurate information, or more generalized information of a general pitch variation tendency. The information indicative of a tendency relating to the number of notes in each section is information relating to each individual note to exist in the phrase. Each such section corresponds to a short independent portion of a melody called a "phrase". The information relating to each individual note in the phrase which is most familiar to non-professional users may be words for a music piece. Although there are of course some exceptions from the view point of the musical theory, individual syllables in the words in most cases can be regarded as corresponding more or less to individual notes, and thus it is very preferable to make use of such an idea in automatic music composing techniques because the idea greatly simplifies user's data entry for music composition. The information indicative of a tendency relating to the number of notes in a single phrase can be entered by the user making and entering words suitable for the phrase. For languages such as Japanese where in most cases each letter corresponds to one syllable, this is very convenient because entering words in characters results directly in entry of syllable information.

Of course, for other languages such as English where letters of words do not correspond to syllables on a one-to-one basis, syllables of the words phrases can be analyzed on the basis of entered letters of the words, so that the thus-analyzed syllable information can be used as the above-mentioned information indicative of a tendency relating to the number of notes. However, the simplest method will be to enter a desired words phrase in the form of scat having a single syllable like "Du" rather than entering the words in letters. In such a case, entering, in addition to syllable information of the words, information indicating long vowels as necessary may be very useful in determining a length of note corresponding to each note. In this manner, a length and pitch of each note to be contained in each phrase can be determined on the basis of entry of the information indicative of a tendency relating to the number of notes in each of the sections, and thus data of a music piece can be generated automatically.

According to the present invention thus arranged, the user only has to enter the information indicative of a tendency relating to the number of notes in each phrase in the form of words information or syllable information such as scat, with the result that the user need not have any special knowledge of music. Further, because the information indicative of a tendency relating to the number of notes can be entered by the user entirely freely, a music piece with free note arrangement (position and length of each note in a measure), and besides, the user's intention can be reflected easily on the music piece.

Preferably, the above-mentioned supply section includes a memory having prestored therein a plurality of pieces of the music template information for a plurality of different music pieces, and a selection section for selecting from the memory a desired piece of the music template information. This permits automatic composition, free of any musical problem, by use of music template information for an already-composed music piece without requiring the user's special knowledge of music.

The supply section may further include a section which, in response to an operation of the user, changes the contents of the piece of the music template information selected by the selection section. Because the change is made to the music template information, it allows the user's intention to be easily reflected in the music piece composed.

The present invention also provides a method of automatically composing music using a computer which comprises the steps of supplying music template information including at least information indicative of a pitch variation tendency in each of a plurality of sections forming a music piece, inputting, in response to an operation of a user, information indicative of a tendency relating to a number of notes in each of sections of a music piece to be composed, and determining a length and pitch of each note to be contained in each of the sections, on the basis of the music template information and the information indicative of a tendency relating to a number of notes in each of sections inputted by the input section.

The present invention further provides a method of automatically composing music using a computer which comprises the steps of analyzing musical characteristics for each of a plurality of sections forming a music piece and, on the basis of the analyzed musical characteristics, supplying music template information including at least information indicative of a pitch variation tendency in the section and information relating to a number of notes and a position of each the note in the section, storing the supplied music template information into a memory, the memory storing a plurality of pieces of the music template information for a plurality of music pieces, selecting from the memory a desired piece of the music desired template information in response to an operation of a user, editing contents of the selected piece of the music template information in response to an operation of the user, and determining a position, length and pitch of each note to be contained in each of the sections, on the basis of the piece of the music template information selected and edited in the steps of selecting and editing, so as to generate music data.

The present invention further provides a machine-readable recording medium which contains a program to be executed by a computer for implementing the automatic music composing method proposed above.

An automatic music composing device in accordance with another aspect of the present invention comprises an information supply section for supplying information including at least syllable data corresponding to words for a music piece to be composed, a setting section for setting characteristic data to characterize the music piece to be composed, and a music piece generation section for generating the music piece corresponding to the words on the basis of the information including the syllable data supplied by the information supply section and the characteristic data set by the setting section.

The characteristic data characterizing the music piece to be composed are for example the arrangement of passages, key, time and pitch range of the music piece, which may be designated by the user or prestored within the music composing device. Normally, a music piece may be automatically composed by just designating the characteristic data, but the present invention is designed to automatically generate a music piece well matching the user-specified syllable data corresponding to the words in consideration of its relations with the syllable data.

An automatic music composing device in accordance with still another aspect of the present invention comprises a performance data input section for inputting performance data that represents a music piece having a plurality of sections, a characteristic extraction section for analyzing the performance data for each of the sections so as to extract musical characteristics of the section, a storage section for storing the musical characteristics of each of the sections extracted by the extraction section as characteristic data to characterize the music piece, and a music piece generation section for generating performance data representing a new music piece, on the basis of the characteristic data stored in the storage section.

If performance data representing a music piece are for example MIDI data, the performance data input section supplies the performance data along with data indicative of phrase divisions, measure lines, etc. The characteristic extraction section analyzes the performance data for each phrase and measure line in order to extract the musical characteristics, such as pitch and rhythm patterns, for each phrase and measure. Therefore, the characteristic extraction section extracts a plurality of the musical characteristics for a single music piece. The storage section stores, as characteristic data for a music piece, the plurality of the musical characteristics extracted by the characteristic extraction section. The music piece generation section generates a new music piece on the basis of the characteristic data stored in the storage section. Thus, if it is desired to edit a portion of the music piece generated by the music piece generation section, the present invention greatly facilitates the desired editing by modifying those of the stored characteristic data that are associated with the relevant phrase and measure line.

BRIEF DESCRIPTION OF THE DRAWINGS

For better understanding of the above and other features of the present invention, the preferred embodiments of the invention will be described in detail below with reference to the accompanying drawings, in which:

FIG. 5 is a diagram showing exemplary results of the analyzing and extracting process which is performed on musical characteristics for the whole of a music piece;

FIG. 6 is a diagram showing results of the analyzing and extracting process which vary with the progression of a music piece;

FIG. 7A to 7G are diagrams showing examples of words data entering screens;

FIGS. 8A and 8B are diagrams showing exemplary data formats in words and music memories, respectively, within a working memory of FIG. 2;

FIG. 12 is a flowchart illustrating details of the latter half of the process for setting beats of the first and last syllables;

FIG. 13 is a diagram showing examples of beats set by the process for setting beats of the first and last syllables detailed in FIGS. 11 and 12;

FIGS. 15A and 15B are diagrams showing examples of beat priority setting tables to be used for determining occurrence frequencies at individual tone generation timing in a phrase and determining note-assigning priority during the rhythm pattern generating process detailed in FIG. 14;

FIG. 18 is a graph conceptually illustrating a process for setting pitches of syllables other than the first and last syllables on the basis of a template specified in the pitch pattern generating process of FIG. 16;

FIG. 19 is a diagram conceptually illustrating a process for assigning syllables other than the first and last syllables via a template in the pitch pattern generating process of FIG. 16; and FIGS. 20A and 20B are diagrams explanatory of a manner in which syllable information is entered in the form of scat.

DETAILED DESCRIPTION OF THE PREFERRED EMBODIMENTS

Figure 2:
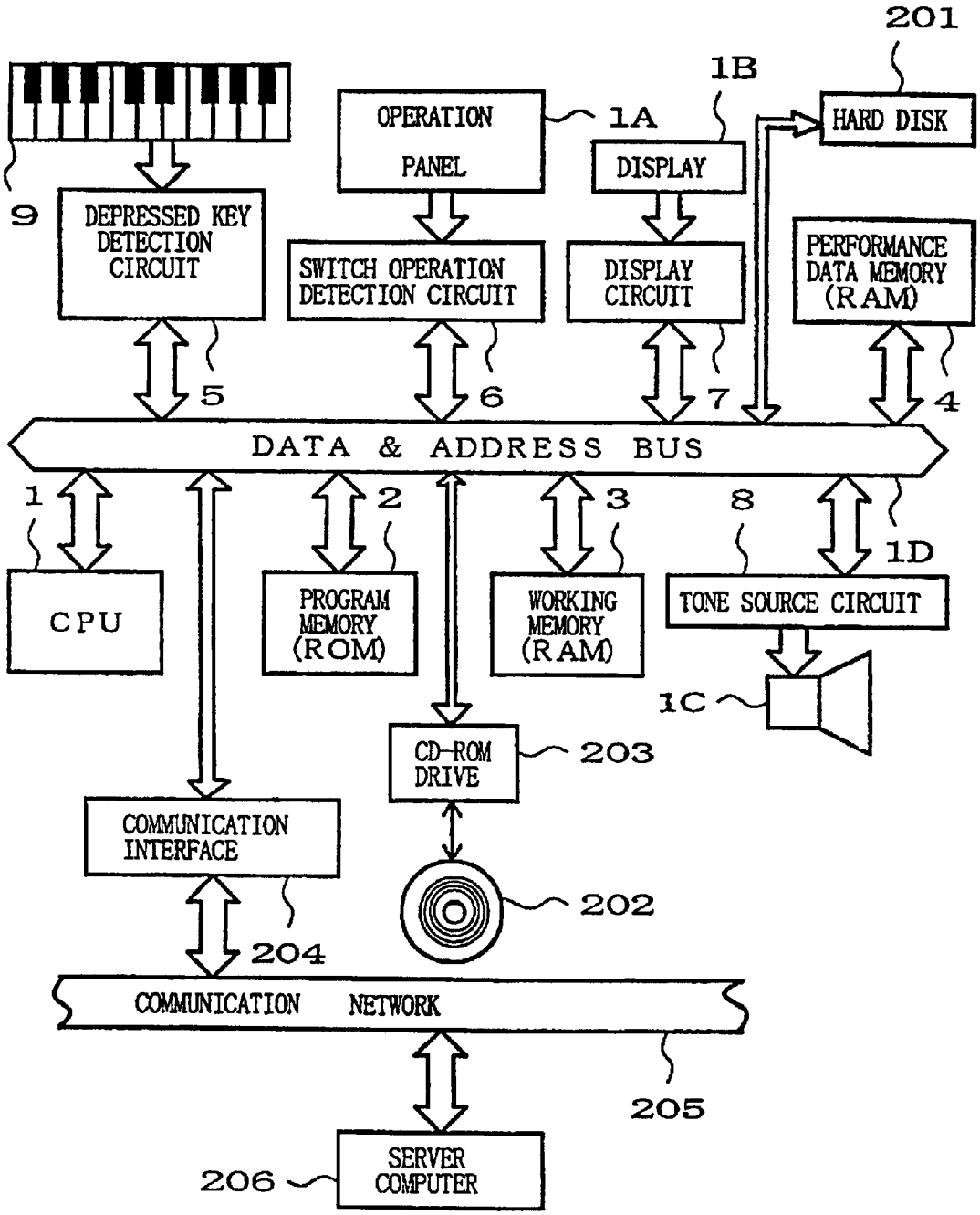
FIG. 2 is a hardware block diagram showing a structure of an electronic musical instrument which includes a memory containing the program for the automatic music composing device of FIG. 1.

FIG. 2 is a hardware block diagram showing a structure of an electronic musical instrument containing a computer processing program that implements an embodiment of an automatic music composing device according to the present invention.

The electronic musical instrument is controlled by a microcomputer comprised of a microprocessor unit (CPU) 1, a program memory 2 and a working memory 3.

The CPU 1 controls the overall operation of the electronic musical instrument. As shown, to this CPU 1 are connected, via a data and address bus 1D, the program memory 2, the working memory 3, a performance data memory (RAM) 4, a depressed key detection circuit 5, a switch operation detection circuit 6, a display circuit 7 and a tone source circuit 8.

The program memory 2 is a read-only memory (ROM) which has stored therein various programs to be run by the CPU 1, various data and various marks and letters. In this program memory 2, there is also stored an operating program for implementing an automatic music composing method according to the principle of the present invention.

The working memory 3 is allocated in predetermined address areas of a random access memory (RAM) for use as various registers and flags for temporarily storing performance information and various data which occur as the CPU 1 executes the programs.

The performance data memory (RAM) 4 is provided to prestore, for a plurality of music pieces, various performance-related data such as music piece templates, pitch patterns and rhythm patterns, i.e., data indicating musical characteristics of an analyzed music piece.

Keyboard 9 connected to the depressed key detection circuit 5 has a plurality of keys for designating the pitch of any tone to be generated and key switches provided in corresponding relations to the keys. Depending on the applications, the keyboard 9 may also include a key-touch detection means such as a key-depression velocity or force detecting device.

The depressed key detection circuit 5, which comprises circuitry including a plurality of key switches corresponding to the keys on the keyboard 9, outputs a key-on event information signal upon detection of each new depressed key and a key-off event information signal upon detection of each new released key. The depressed key detection circuit 5 also generates key touch data by determining the key-depression velocity or force and outputs the generated touch data as velocity data. In this embodiment, each of the key-on and key-off event information and velocity data is expressed on the basis of the MIDI standards and contains data indicative of a key code of the depressed or released key and a channel to which tone generation of the key is assigned.

On an operation panel 1A, there are provided an analyzing switch to initiate an analysis and extraction of musical characteristics of an already-composed (existing) music piece, an arranging switch to initiate automatic composition of a music piece based on the results of the analysis and extraction, ten-keys to enter numerical value data, a keyboard to enter letter data, and various other operators to enter various musical conditions relating to automatic music piece composition. Although the operation panel 1A includes other operators for selecting, setting and controlling the pitch, color, effect, etc. of each tone to be generated, these operators will not be described in detail because they are well known in the art.

The switch operation detection circuit 6 detects an operational condition of each of the switches and operators to provide switch event information corresponding to the detected condition to the CPU 1 via the data and address bus 1D.

The display circuit 7 shows on a display 1B various information such as the controlling conditions of the CPU 1 and contents of various setting data, and the display 1B may comprise for example a liquid crystal display (LCD) that is controlled by the display circuit 7.

The above-mentioned operation panel 1A and display 1B together constitute a GUI (Graphical User Interface).

The tone source circuit 8 has a plurality of tone generation channels, by means of which it is capable of generating plural tones simultaneously. The tone source circuit 8 receives performance information (data complying with the MIDI standards) supplied via the data and address bus 1D, and it generates tone signals on the basis of the received data. Any tone signal generating method may be used in the tone source circuit 8 depending on an application intended. For example, any conventionally-known tone signal generating method may be used such as: the memory readout method where tone waveform sample value data stored in a waveform memory are sequentially read out in accordance with address data that change in correspondence to the pitch of tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter.

The tone signals thus generated by the tone source circuit 8 are sounded or audibly reproduced via a sound system 1C comprised of amplifiers and speakers (not shown).

In a hard disk 201, there may be stored various data such as music template information as stored in the performance data memory 4 and the above-mentioned operating program for automatic composition as stored in the program memory 2. By prescoring the operating program in the hard disk 201 rather than in the ROM 2 and loading the operating program into the RAM 3, the CPU 1 can operate in exactly the same way as where the operating program is stored in the ROM 2. This greatly facilitates version-up of the operation program, addition of an operating program, etc. A CD-ROM (compact disk) 202 may be used as a removably-attachable external recording medium for recording various data such as performance data, music template information and an optional operating program similarly to the above-mentioned. Such an operating program and data stored in the CD-ROM 202 can be read out by a CD-ROM drive 203 to be transferred for storage into the hard disk 201. This facilitates installation and version-up of the operating program. The removably-attachable external recording medium may of course be other than the CD-ROM, such as a floppy disk and magneto optical disk (MO).

A communication interface 204 may be connected to the bus 1D so that the microcomputer system can be connected via the interface 204 to a communication network 205 such as a LAN (Local Area Network), internet and telephone line network and can also be connected to an appropriate sever computer 206 via the communication network 205. Thus, where the operating program and various data are not contained in the hard disk 201, these operating program and data can be received from the server computer 206 and downloaded into the hard disk 201. In such a case, the microcomputer of the electronic musical instrument, i.e., a "client", sends a command requesting the server computer 206 to download the operating program and various data by way of the communication interface 204 and communication network 205. In response to the command, the server computer 206 delivers the requested operating program for automatic composition and data to the microcomputer via the communication network 205. The microcomputer completes the necessary downloading by receiving the operating program and data via the communication network 204 and storing these into the hard disk 201.

It should be understood here that the microcomputer of the electronic musical instrument may be implemented by installing the operating program and various data corresponding to the present invention in any commercially available personal computer. In such a case, the operating program and various data corresponding to the present invention may be provided to users in a recorded form on a recording medium, such as a CD-ROM or floppy disk, which is readable by a personal computer that is used implement automatic composition according to the present invention. Where the personal computer is connected to a communication network such as a LAN, the operating program and various data may be supplied to the personal computer via the communication network similarly to the above-mentioned.

Next, a description will be made about exemplary operation of the automatic music composing device according to the present invention, with reference to FIG. 1.

Figure 1:
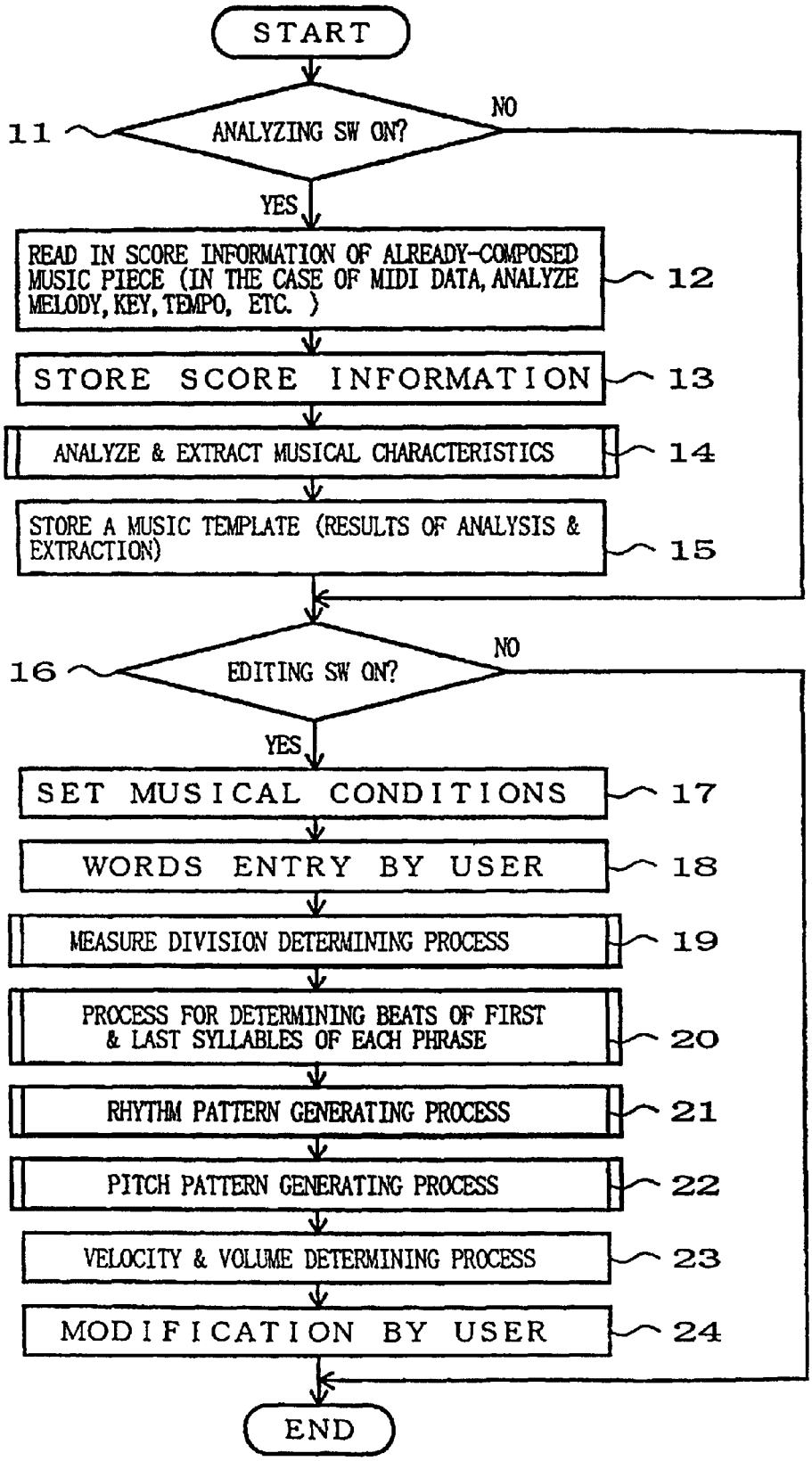
FIG. 1 is a flowchart illustrating an example of a program run by a computer to implement a function of an automatic music composing device according to the present invention.

FIG. 1 is a flowchart illustrating an exemplary step sequence taken when the electronic musical instrument of FIG. 2 is operated as the automatic music composing device, which executes an analysis and extraction of musical characteristics of an already-composed music piece at steps 12 to 15 and stores results of the analysis and extraction as a composition template. The automatic music composing device automatically composes a music piece through operations of steps 17 to 24 on the basis of the stored composition template that is modified by the user as appropriate.

At step 11, a determination is made as to whether the analyzing switch has been actuated on the operation panel 1A. If the analyzing switch has been actuated (YES), the operations of steps 12 to 15 are executed; otherwise (NO), the CPU 1 jumps to step 16.

At step 12, various information on the score of the already-composed music piece is read in. For example, the title, musical style, genre, melody, chord progression, words, key, time, tempo, measure lines, phrase divisions are input by use of the GUI (operation panel 1A and display 1B), keyboard 1B, etc. If the already-composed music piece can be read in as MIDI data, the melody, key, tempo, etc. may be analyzed on the basis of the MIDI data with the unanalyzable title, musical style, etc. being introduced by the user via the GUI. At step 13, the score information input through the operation of step 12 is stored into a predetermined region of the working memory 3.

Figure 3:
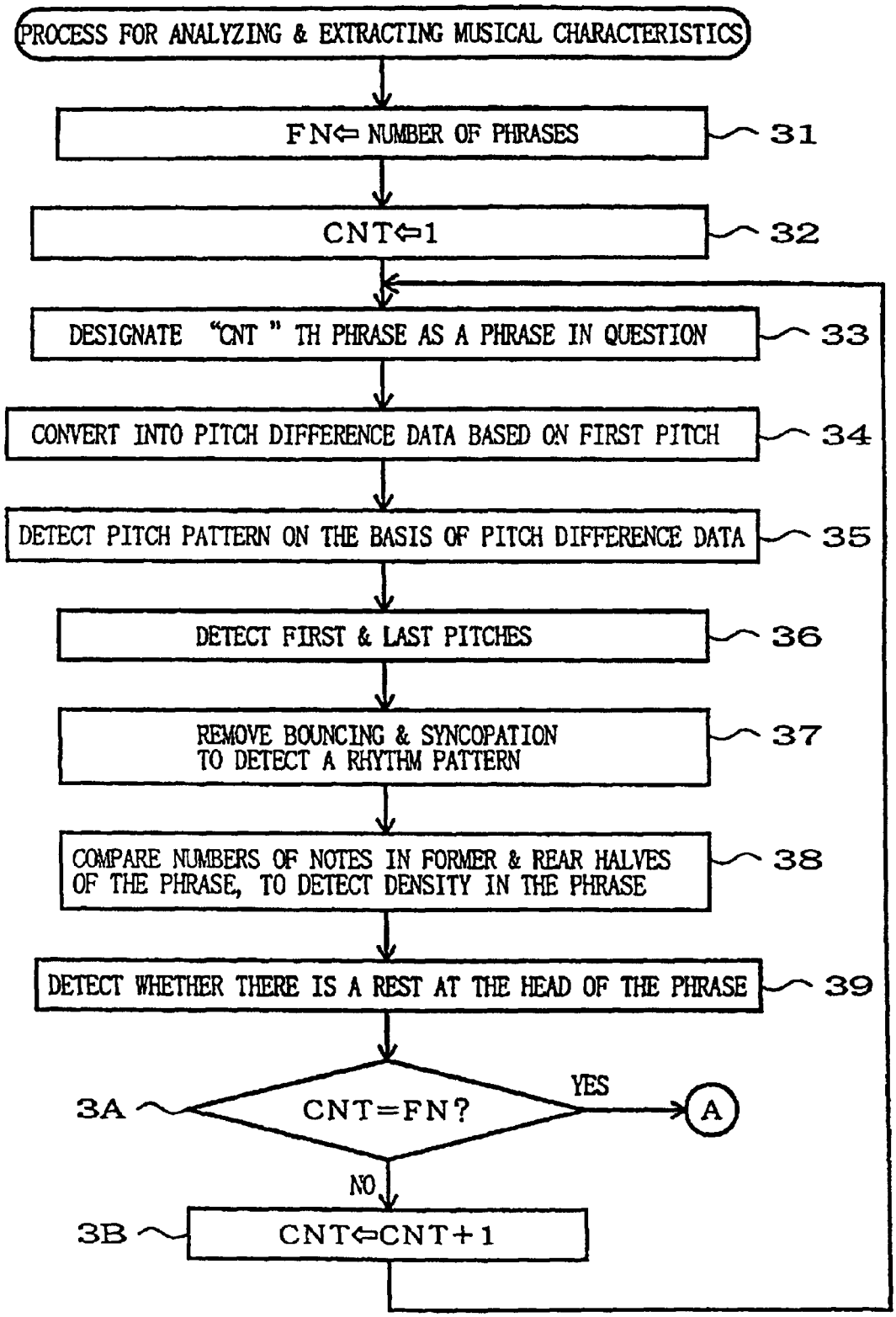
FIG. 3 is a flowchart showing details of the former half of an analyzing and extracting process of FIG. 1.
Figure 4:
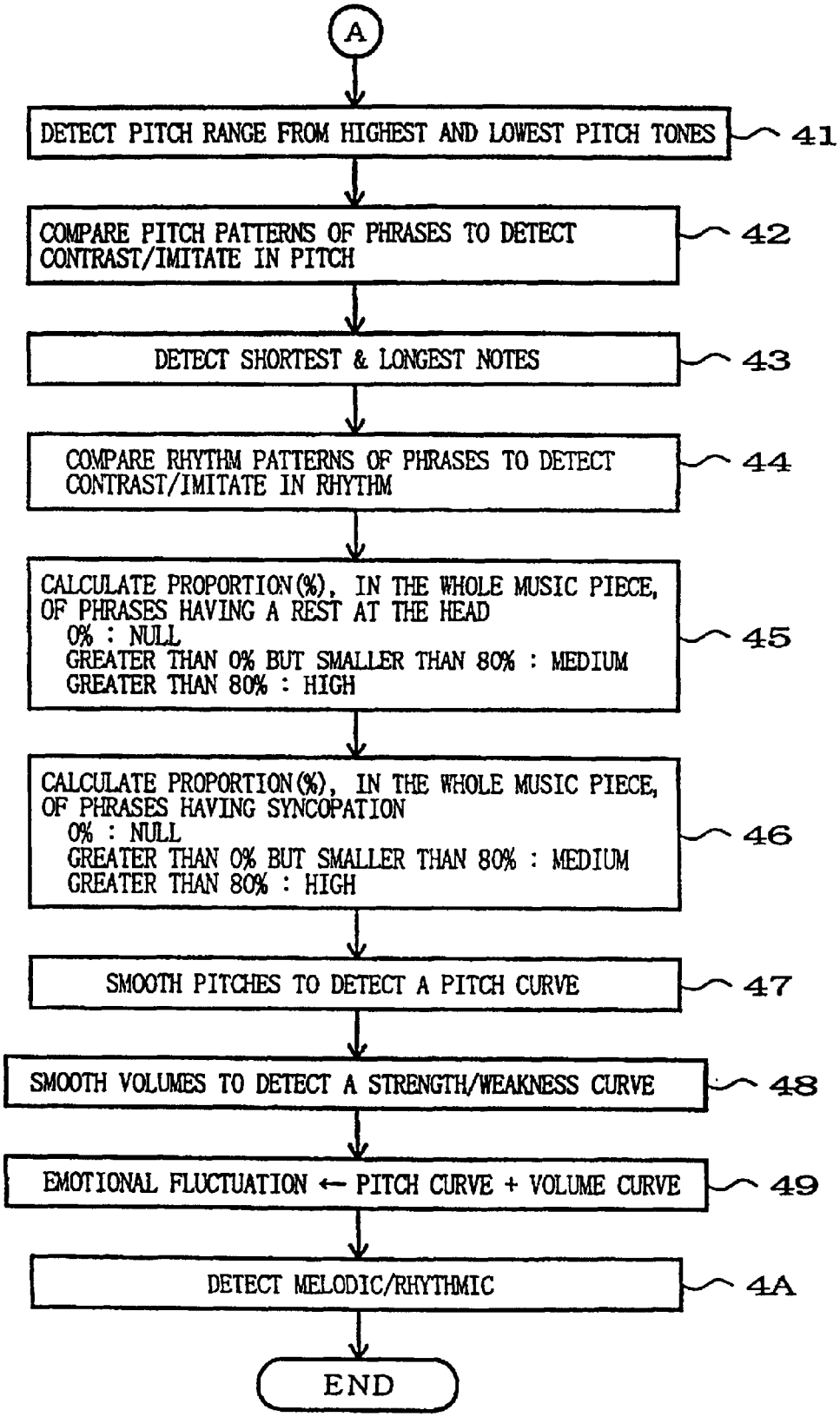
FIG. 4 is a flowchart showing details of the latter half of the analyzing and extracting process of FIG. 1.

At next step 14, the CPU 1 executes a process to analyze and extract the musical characteristics of the music piece on the basis of the score information having been input in the above-mentioned manner. FIGS. 3 and 4 show details of the analyzing and extracting process, where operations of steps 31 to 3B of FIG. 3 are performed for each individual phrase contained in the score information while operations of steps 41 to 4A of FIG. 4 are performed for the whole of the score information. The analyzing and extracting process is carried out in the following step sequence.

Step 31: The score information of the already-composed music piece is read out from the working memory 13, and the number of the phrases contained in the score information is determined and stored into a number-of-phrases register FN.

Step 32: A counter register CNT is set to a value of "1".

Step 33: The operations of steps 34 to 39 are performed for the phrase of the phrase number designated by the counter register CNT as a "phrase in question". The operations of steps 34 to 36 analytically extracts pitch-related factors out of the score information, while the operations Steps 37 to 39 analytically extracts rhythm-related factors out of the score information.

Step 34: The melody of the phrase in question is converted into individual pitch difference data using the first pitch of the phrase as a pitch converting basis.

Step 35: The pitch pattern of the phrase in question is detected on the basis of the pitch difference data obtained at step 34. In this case, a line graph plotted by connecting every pitch difference data within the phrase may be used as the pitch pattern. However, because such a line graph connecting every pitch difference data will considerably complicate a later-described pitch contrast/imitate determination, this embodiment uses, as the pitch pattern of the phrase, a line graph plotted by connecting only four pitches, i.e., the first and last and highest and lowest pitches in the phrase. If, however, the first or last pitch is the same as the highest or lowest pitch, a line graph connecting two or three of the pitches is used as the pitch pattern of the phrase. Alternatively, a line graph may be used which is plotted by extracting the maximal and minimal pitches from the graph connecting every pitch difference data and connecting the extracted pitches and first and last pitches of the phrase.

Step 36: The first and last pitches of the phrase are detected.

Step 37: Bouncing and syncopation are removed from the rhythm pattern of the phrase to detect a primitive rhythm pattern of the phrase. Although the original rhythm pattern of the score information may be directly used as the primitive rhythm pattern, it will considerably complicate the later-described pitch contrast/imitate determination. Thus, this embodiment includes sets of detecting patterns to be used for detecting bouncing and syncopation and basic patterns obtained by removing such bouncing and syncopation from the detecting patterns, and it removes bouncing and syncopation from the phrase's rhythm pattern by replacing a portion of the phrase's rhythm pattern matching one of the detecting patterns with the corresponding basic pattern, so as to create the primitive rhythm pattern.

Step 38: A comparison is made between the numbers of notes present in the former and latter halves of the phrase, in order to detect a note density in the phrase; for example, for example, where the phrase has two measures, a comparison is made between the numbers of notes present in the former and latter measures of the phrase. If the difference in the number of notes between the former and latter measures is three or more, one of the measures that has more notes is determined as dense and the other measure having less notes is determined as sparse. If, however, the difference in the number of notes present between the two measures is two or less, then the measures are determined as having an equal number of notes, not as dense and sparse.

Step 39: A determination is made as to whether there is a rest at the head of the phrase, i.e., whether there is a time delay at the first beat of the phrase.

Step 3A: A determination is made as to whether the current values in the counter register CNT and phrase number register FN are equal. If the determination is in the affirmative (YES), this means that the operations of steps 33 to 39 have been completed for all the phrases contained in the score information, and thus the CPU 1 executes operations at and after step 41 of FIG. 4 so as to conduct the analyzing and extracting process for the whole of the score information. If, however, the current values in the counter register CNT and phrase number register FN are not equal, this means that there are still one or more phrases to be subjected to the analyzing and extracting process, and thus the CPU 1 reverts to step 33 by way of step 3B.

Step 3B: Because of the negative determination at step 3A, the CPU 1 reverts to step 33 after incrementing the counter register CNT by "1".

A description will next be made about the analyzing and extracting process for the whole of the score information of steps 41 to 4A of FIG. 4.

Step 41: Pitch range for the whole of the score information is detected on the basis of the highest and lowest pitches contained in the information.

Step 42: On the basis of the line graph obtained at step 35, it is examined here whether the individual phrases are approximate or similar in pitch pattern to each other. If the examination shows that the phrases are approximate or similar in pitch pattern, the phrases following the first phrase are determined as imitating the pitches of the first phrase.

Step 43: From the whole score information are detected such notes having the shortest and longest duration (i/e/., the shortest and longest notes).

Step 44: On the basis of the primitive rhythm obtained at step 37, it is examined whether the individual phrases are approximate or similar in rhythm pattern to each other. If the examination shows that the phrases are approximate or similar in rhythm pattern, the phrases following the first phrase are determined as imitating the rhythm pattern of the first phrase.

Step 45: It is examined what proportion (percentage) of the whole score information (i.e., the whole music piece) the phrases detected at step at 39 as having a rest account for. If the rate is 0 percent, the phrase occupancy is treated as "null", if the proportion is greater than 0 percent but smaller than 80 percent, the phrase occupancy is treated as "medium", and if the proportion is more than 80 percent, the phrase occupancy is treated as "high".

Step 46: It is examined what proportion (percentage) of the whole score information (i.e., the whole music piece) the phrases having syncopation removed therefrom at step 37 account for. If the proportion is 0 percent, the phrase occupancy is treated as "null", if the proportion is greater than 0 percent but smaller than 80 percent, the phrase occupancy is treated as "medium", and if the proportion is more than 80 percent, the phrase occupancy is treated as "high", at step 45.

Step 47: The pitches in the whole score information are smoothed so as to obtain a pitch curve; for example, the pitch curve may be obtained by connecting the pitch of every note with a spline or Bezier curve.

Step 48: The volume values in the whole score information are smoothed so as to obtain a strength/weakness curve; for example, the strength/weakness curve may be obtained by connecting the velocity value of every note with a spline or Bezier curve.

Step 49: The pitch and strength/weakness curves obtained at steps 47 and 48, respectively, are added together and set as an emotional fluctuation curve. Alternatively, the emotional fluctuation curve may be obtained by multiplying or averaging the pitch and strength/weakness curves.

Step 4A: A determination is made as to whether the whole score information is melodic or rhythmic. If the tempo value is greater than a predetermined value, the whole score information is determined as rhythmic; otherwise, the whole score information is determined as melodic. Alternatively, if the average value of the duration time is greater than a predetermined value, the whole score information may be determined as melodic; otherwise, the whole score information may be determined as rhythmic.

At step 15, the results of the analyzing and extracting process are stored into the performance data memory 4 as a composition template. Consequently, a plurality of results of the user's analysis and extraction will be stored into the performance data memory 4. The above-described analyzing and extracting process may be performed for a specific number of music pieces, each representing a different genre, to store the processed results of the musical pieces in advance.

FIG. 5 is a diagram showing exemplary results of the above-described analyzing and extracting process performed on musical characteristics for the whole of an overall music piece, and the processed results are stored in memory in a plurality of items: musical form; general musical motif; general rhythm condition; and pitch condition.

In the musical form block of FIG. 5 is stored a musical form of the music piece in terms of a passage pattern such as "A—B—C—C'" or "A—A'—B—B'".

The musical motif block includes a genre storing location, an image music piece storing location, a composer storing location and melodic/rhythmic selection location. In the genre storing location is stored a name of genre of a music piece to be composed. Although "8 beat" is stored in the illustrated example, the genre name to be stored in this location may be "dance and pop music" (rap, Euro-beat or pop ballad), "soul music" (such as dance funk, soul ballad or R & B), "rock music" (such as soft 8 beat, 8 beat or rock'n roll), "jazz music" (such as swing, jazz ballad or jazz bossa nova), "Latin music" (such as bossa nova, samba, rumba, beguine, tango or reggae), "march music", "enka" (which is a type of Japanese popular song full of melancholy), and "shoka" (which are Japanese songs for schoolchildren).

In the image storing location of the musical motif block of FIG. 5 is stored a name of a particular music piece that appears similar in musical image to the music piece to be composed. In the composer storing location is stored the name or the like of the composer of the music piece to be composed. In the melody/rhythmic selection location is stored the result of step 49 of FIG. 4. The stored contents in these locations will influence the creation of pitch and rhythm patterns of the music piece to be composed so as to characterize the music piece during automatic composition thereof.

The general rhythm condition block of FIG. 5 includes a time storing location, a tempo storing location, a shortest note storing block location, a first-beat delay frequency storing location and a syncopation frequency storing location.

In the time storing location is stored the time of the music piece; time "4/4" is stored in the illustrated example. In the tempo storing location is stored a tempo of the music piece which is expressed in the form of a metronome mark or speed-indicating characters; in the illustrated example, a metronome mark is stored which indicates 120 quarter-notes per minute. In the shortest note storing location is stored a note having the shortest duration detected at step 43 of FIG. 4; an eighth note is stored in the illustrated example. In the first- beat delay frequency storing location is stored a frequency ("null", "medium" or "high"), detected at step 45 of FIG. 4, at which the first beat is delayed. In the syncopation frequency storing location is stored a frequency of syncopation ("null", "medium" or "high"), detected at step 46 of FIG. 4.

The general pitch condition block of FIG. 5 includes a pitch range storing location and a musical key storing location. In the pitch range storing location is stored a pitch range, detected at step 41 of FIG. 4, which is represented in key codes of the highest and lowest pitches in the range; key codes "A2–E4" are stored in the illustrated example. The pitch range stored in this location will influence the creation of a pitch pattern of the music piece during the automatic composition. In the key storing location is stored a musical key, analytically detected at step 12 of FIG. 1, in its corresponding code; a key "Fm (F minor)" is stored in the illustrated example. The musical key stored in this location will influence the creation of a scale of the music piece during the automatic composition.

FIG. 6 is a diagram showing exemplary results of the musical characteristics analyzing and extracting process which vary with the progression of a music piece. The results are stored in memory in the illustrated format in correspondence with the passages of the musical form of FIG. 5. The results represent three major musical characteristics that relate to an emotional fluctuation curve of the whole music piece and pitches and rhythms analyzed and extracted for each of the phrases forming the passages of the music piece.

In an emotional fluctuation block of FIG. 6, there is stored a curve representing an emotional fluctuation in the whole music piece that is obtained at step 49. The emotional fluctuation curve will influence pitch and rhythm patterns and volume during automatic composition.

Pitch block of FIG. 6 for storing pitch-related information of the individual phrases in each of the passages includes a pitch pattern storing location, a first/last tone storing location, an activeness/quietness storing location and a contrast/imitate storing location. In the pitch pattern storing location is stored a pitch pattern of each phrase analytically extracted at step 35 of FIG. 3. The pitch pattern stored in this location is multiplied by the above-mentioned emotional fluctuation curve so as to influence the emotional rising and falling in the whole music piece.

In the first/last tone storing location are stored the first and last pitches of each phrase, analytically extracted at step 36 of FIG. 3, in their degrees (I, II, III, IV, V, VI, VII, etc.). In the activeness and quietness storing location are stored a curve representing degrees of activeness and quietness in the whole music piece. The curve representing degrees of activeness and quietness is plotted by connecting, with a spline or Bezier curve, average pitch values, numbers of bouncing and syncopation detected at step 37 of FIG. 3, average pitch difference values detected at step 34 for the individual phrases, or values obtained by arithmetically processing these values. In the contrast/imitate storing location is stored each passage which is a subject for the contrast/imitate consideration. In the illustrated example, the third and fourth passages "C" and "C'" are approximate or similar to each other, and thus the former half of the contrast/imitate storing location for the fourth passage C' has a statement "imitating the former half of the third passage C'" and the latter half of the contrast/imitating storing location for the fourth passage C' has a statement "imitating the latter half of the third passage C'". Other storing locations than the above-mentioned may be provided as necessary, such as one for storing data that acts to make the pitches resemble the intonation found in the words.

Further, rhythm block of FIG. 6 includes a denseness/sparseness storing location, a phrase head delay specifying locations, a contrast/imitate storing location and a syncopation specifying location. In the denseness/sparseness storing location is stored a denseness/sparseness pattern of the individual phrases detected at step 38 of FIG. 3; in the illustrated example, the dense state is shown by a half-tone dot mesh block and the sparse or uniform state is shown by a blank or absence of the half-tone dot mesh block. In the phrase head delay specifying location are stored data indicating presence or absence of a rest at the head of each phrase detected at step 39 of FIG. 3; the illustrated example shows that there are such delays in the former phrases of the third passage C and fourth passage C' while there is no such delay in the latter phrases of the third passage C and fourth passage C'. In the contrast/imitate storing location is stored each passage that is a subject for the contrast/imitate consideration, as in the above-mentioned contrast/imitate storing location of the pitch block. Finally, in the syncopation specifying location is stored "absence" or "presence" indicating whether or not syncopation has been removed at step 37 of FIG. 3.

Referring back to FIG. 1, a determination is made at step 16 as to whether the editing switch has been turned ON or activated on the operation panel 1A. If the editing switch has been turned ON on the operation panel 1A (YES), the CPU 1 executes an automatic composition process of steps 17 to 24; if not (NO), the CPU 1 ends the execution of the program. Namely, the activation of the editing switch can cause the electronic musical instrument to operate as the automatic music composing device. Thus, in response to the activation of the editing switch, automatic composition is executed through operations of steps 17 to 24.

When the editing switch is activated to cause the electronic musical instrument to operate as the automatic music composing device, it is necessary for the user to set various musical conditions at step 17 and enter words at step 18. Once the musical conditions are set and the words are entered by the user, the CPU 1 executes operations of steps 19 to 23 in accordance with the musical conditions and words and internal musical conditions prestored within the device, so as to automatically compose a music piece. Finally, at step 24, the music piece is completed by the user modifying the automatically composed music piece.

More specifically, at step 17, the user sets the user musical conditions using the GUI (operation panel 1A and display 1B) to enter data in the individual blocks and locations on the screens as shown in FIGS. 5 and 6 (hereinafter these screens will be called "musical condition setting screens"). Preferably, the musical condition setting screens are provided by reading out one of the plurality of music templates analytically extracted out of an already-composed music piece as shown in FIGS. 5 and 6 to store the read-out music template into a buffer memory, and then using the thus-stored music template. The contents of the buffer-stored music template (FIGS. 5 and 6) may be edited by the user as necessary. Alternatively, the user may create a desired music template (FIGS. 5 and 6) on his own. At next step 18, the user enters words data on screen as shown in FIG. 7 using the above-mentioned GUI.

FIGS. 7A to 7G show exemplary screens for use in entering the words. In the screen of FIG. 7A, there are shown only passage marks "A" and "B" corresponding to passages set in accordance with the musical form. To the right of the passage marks on the screen, the user sequentially enters words comprising syllable data relating to the words of a music piece to be composed, phrase dividing marks, measure line marks and long vowel marks. The illustrated example assumes that one line of each passage corresponds to four measures.

In order to designate a phrase (a short independent portion of melody line), the user enters space marks (triangle marks "Δ" in the illustrated example) at locations corresponding to phrase-dividing points, as shown in FIG. 7B. Such space marks become phrase-dividing marks.

Measure line marks "/" may be entered at each location of a measure line in order to designate a boundary, i.e., division between measures, as shown in FIG. 7C. Also, long vowel marks "-" may be entered after predetermined syllable data, as shown in FIG. 7D. The note length allocated to the syllable data may be controlled by entering a plurality of the long vowel marks in succession.

Further, accent marks "." may be added to each appropriate syllable data. The pitch and velocity of each syllable data with the accent mark will be set slightly higher than other syllable data during a subsequent automatic composition. The intonation of the syllable data may be entered in a broken line, as shown in FIG. 7F. Further, the syllable data located at each climax portion of the music piece may be designated in a half-tone dot mesh block, as shown in FIG. 7G.

While the entry of the syllable data and the setting of the phrase dividing marks are essential to this embodiment, the entry of the measure line marks "/", long vowel marks "-" accent marks "." and intonation and climax indications is optional, i.e., may be made only when the user thinks they are necessary. Also, divisions between syllables and rhyming points may be set as needed.

The thus-entered words data are stored into a words memory area within the working memory 3. FIG. 8A shows an exemplary stored format of Japanese words data corresponding to FIGS. 7D to 7G. Namely, the words data, such as the syllable data, measure line marks, phrase dividing marks and long vowel marks, entered in the manner shown in FIG. 7D are sequentially stored at consecutive addresses as shown in FIG. 8A. In the illustrated example, measure line mark "/" is stored at address "1", syllable data "ha" at address "2", long vowel mark "-" at address "3", syllable data "ru" at address "4", and so on.

At each address location for the syllable data having the accent mark attached thereto as shown in FIG. 7E, data "1" is stored which indicates presence of an accent, whereas at each address location for the syllable data having no accent mark attached thereto, data "0" is stored which indicates absence of an accent.

Further, at each address location for the syllable data having intonation imparted thereto as shown in FIG. 7F, one of data "H", "M" and "L" standing for high, medium and low, respectively, is stored which corresponds to the intonation-indicating beat line. At each address location for the syllable data designated as part of a climax portion as shown in FIG. 7G, data "1" is stored. Although data "1" indicating the climax portion designation is not shown in FIG. 8A, data "1" is present in the syllable data "bo ku no to mo da/chi -".

Once the user's setting of the musical conditions and entry of the words data are completed, the CPU 1 executes operations of steps 19 to 23 in accordance with the user musical conditions and words data and internal musical conditions prestored within the electronic musical instrument, so as to automatically compose a music piece. The internal musical conditions prestored within the electronic musical instrument include those that act to present genre-specific or composer-specific characteristics, that act to make rhythm patterns easy to sing, that act to make pitch patterns easy to sing, that act to raise pitches and increase note lengths to achieve a tone jump, and that act to make pitch patterns and rhythm patterns resemble each other in rhyming points.

Figure 9:
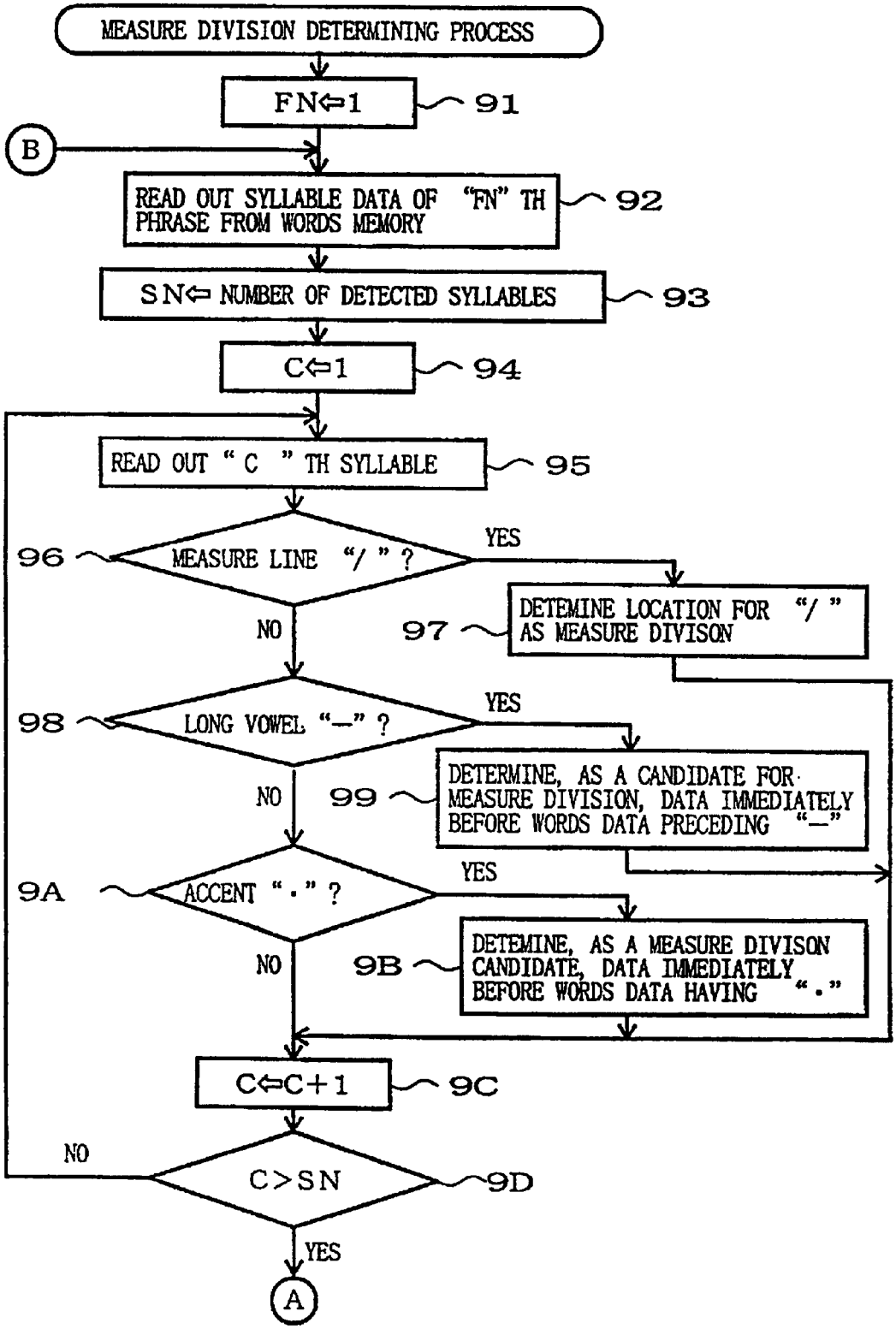
FIG. 9 is a flowchart illustrating details of the former half of a measure division setting process of FIG. 1.
Figure 10:
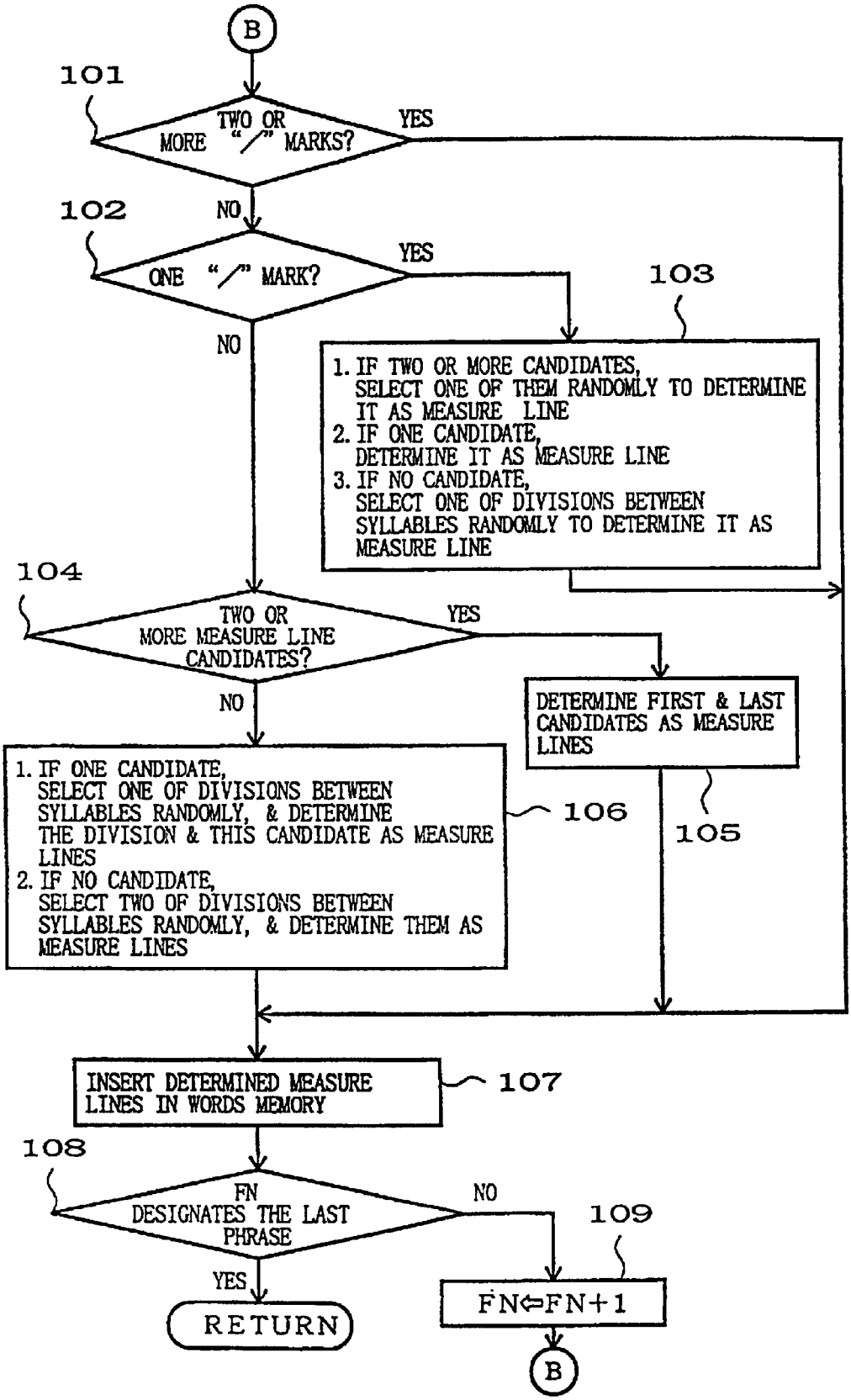
FIG. 10 is a flowchart illustrating details of the latter half of the measure division setting process of FIG. 1.

Referring back to FIG. 1, at step 19, the CPU 1 executes a measure division setting process on the basis of the words data entered in the above-mentioned manner. While the entry of the syllable data and the setting of the phrase dividing marks are absolutely necessary in the embodiment, the entry of the other words data (measure line marks "/", ling sound marks "-", accent marks "." and intonation and climax indications) are optional or may be made only when the user thinks they are necessary. Thus, at step 19, a process is executed for dividing all syllable data of a single phrase into at least two measures on the basis of the entered words data. FIGS. 9 and 10 show details of the measure division setting process, which is performed in the following step sequence.

Step 91: The phrase number register FN is set to a value of "1".

Step 92: From the words memory, all the words data are read out which form a phrase of the phrase number designated by the phrase number register FN. In the case of the words memory shown in FIG. 8A, 15 words data from the measure line mark "/" residing at address "1" to the measure line mark "/" residing at address "15" are read out as the words data for phrase number "1".

Step 93: The number of the words data read out at the preceding step 92 for the phrase of phrase number "1" is stored into a number-of-data register SN.

Step 94: A variable register C is set to a value of "1".

Step 95: The "C"th words data corresponding to the set value in the variable register C is read out.

Step 96: A determination is made as to whether the words data read out at preceding step 95 is a measure line mark "/". If the read-out words data is a measure line mark "/" (YES), the CPU 1 moves to step 97; otherwise, the CPU 1 moves to step 98.

Step 97: Because a measure line position is designated by the user, the address location for the measure line mark "/" is determined as a measure division point.

Step 98: A determination is made as to whether the words data read out at step 95 is a long vowel mark "-". If the read-out words data is a long vowel mark "-" (YES), the CPU 1 moves to step 99, otherwise, the CPU 1 moves to step 9A.

Step 99: The data immediately before the words data (syllable data) preceding the read-out long vowel mark "-" is determined as a candidate for measure division.

Step 9A: A determination is made as to whether any accent is designated for the words data (syllable data) read out at step 95. If answered in the affirmative, the CPU 1 goes to step 9B, but if no accent is designated for the read-out words data, the CPU 1 proceeds to step 9C.

Step 9B: The data immediately before the read-out words data having the accent is determined as a measure division candidate.

Step 9C: The variable register C is incremented by one in order to read out next words data.

Step 9D: A determination is made as to whether the incremented value of the variable register C is greater than the value of the number-of-data register SN. If the incremented value of the variable register C is greater (YES), this means that readout of all the words data of the phrase has been completed, so that the CPU 1 moves to step 101 of FIG. 10. If, however, the incremented value of the variable register C is not greater than the value of the number-of-data register SN, this means that the phrase has further words data to be read out, and hence the CPU 1 reverts to step 95 of FIG. 9 so as to repeat the above-described operations for next words data.

Step 101: Because this embodiment assumes that each phrase consists of two measures, it is determined whether there exit two or more measure line marks "/". If two or more measure line marks exist (YES), the CPU 1 jumps to step 107, but if there exits no or only one measure line mark (NO), the CPU 1 performs operations of steps 102 to 106 so as to determine a measure line.

Step 102: Now that there exits no or only one measure line mark as determined at step 101, the CPU 1 goes to step 103 if only one measure line mark exits, but goes to step 104 if no measure line mark exits.

Step 103: Now that only one measure line mark exits in the phrase as determined at preceding step 102, if there are two or more measure line candidates determined at step 99 or 9B, one of the candidates is selected randomly, so as to finally determine the one measure division point determined from the measure line mark "/" and the randomly selected candidate as two measure line locations. If there exits only one candidate for measure division point, the candidate is determined as a measure line location. If there exits no measure line candidate, one of the divisions between the syllable data is selected randomly and set as a measure line location.

Step 104: Now that preceding step 102 has ascertained that no measure line mark "/" exists in the phrase, it is further determined whether there are two or more measure line candidates determined at step 99 or 9B. With an affirmative determination, the CPU 1 goes to step 105, but if there is no such a candidate, the CPU 1 proceeds to step 106.

Step 105: Now that it has been determined thathere are two or more measure line candidates in the phrase with no measure line mark existing therein, the first and last ones of the candidates are determined as measure line locations.

Step 106: If only one measure line candidate exists in the phrase, this candidate and one division randomly selected from among the divisions between the syllable data are determined as measure line locations. If, however, no measure line candidate exists in the phrase, two divisions randomly selected from among the divisions between the syllable data are determined as measure line locations.

Step 107: Measure line marks are inserted at the two measure line locations determined by the operation of one of steps 103, 105 and 107.

Step 108: A determination is made as to whether the stored value in the phrase number register FN has reached the phrase number of the last phrase. If answered in the affirmative, the CPU 1 returns to end this measure division setting process, but if the stored value of the phrase number register FN has not reached the last phrase number, the CPU 1 branches to step 109.

Step 109: Now that the last phrase number has not been reached as determined at preceding step 108, the value of the phrase number register FN is incremented by one, and the CPU 1 reverts to step 92 of FIG. 9 so as to repeat the above-described operations for a next phrase.

Figure 11:
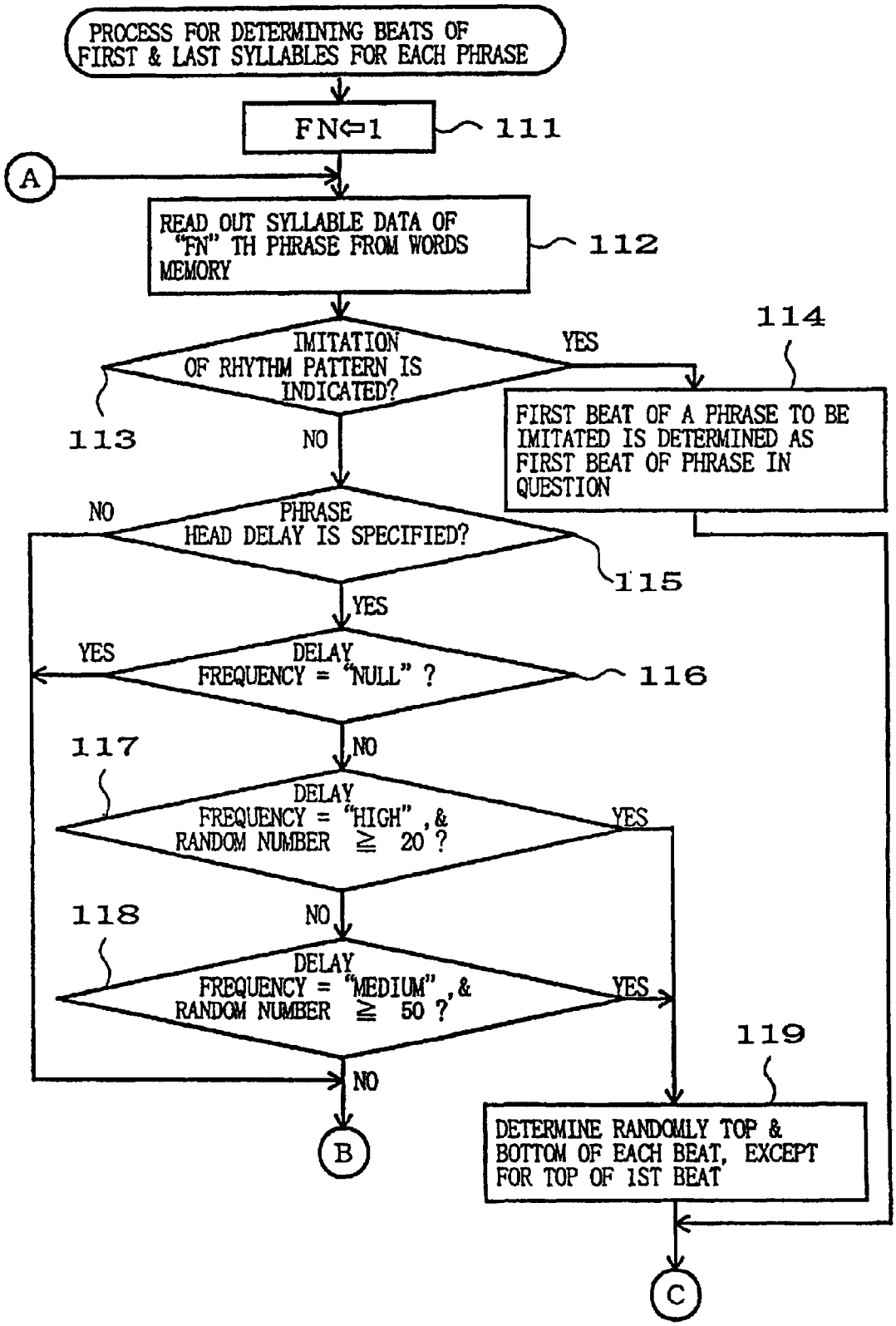
FIG. 11 is a flowchart illustrating details of the former half of a process for setting beats of the first and last syllables of each phrase shown in FIG. 1.

Upon completion of the above-described measure division setting process of step 19, the CPU 1 proceeds to step 20 of FIG. 1 to execute a process for determining beats of the first and last syllables of each phrase. FIGS. 11 and 12 show details of the beat setting process, which is performed in the following step sequence.

Step 111: The phrase number register FN is set to a value of "1".

Step 112: From the words memory, all the words data are read out which form a phrase of the phrase number designated by the phrase number register FN.

Step 113: A determination is made as to whether there is an indication, in the rhythm pattern contrast/imitate row on the musical condition setting screen shown in FIG. 6, to imitate a rhythm pattern. If there is such an indication (YES), the CPU 1 goes to step 114; otherwise, the CPU 1 proceeds to step 115.

Step 114: Now that there is the indication to imitate a rhythm pattern as defined at preceding step 113, the first beat of a phrase to be imitated is determined as the first beat of the phrase in question.

Step 115: A determination is made as to whether there is an indication, in the phrase head delay specifying location on the musical condition setting screen shown in FIG. 6, to effect a delay at the head of the phrase. If there is such an indication (YES), the CPU 1 goes to step 116; otherwise, the CPU 1 proceeds to step 120 of FIG. 12.

Step 116: Now that there is the indication to effect a delay at the head of the phrase as defined at preceding step 115, it is further determined here whether "NULL" is indicated in the first-beat delay frequency storing location on the musical condition setting screen for the whole music piece of FIG. 5. If "NULL" is indicated in the first-beat delay frequency specifying location (YES), the CPU 1 moves to step 120 of FIG. 12, but if "MEDIUM" or "HIGH" is indicated (NO), then the CPU 1 proceeds to step 117.

Step 117: Now that the first beat delay frequency is "MEDIUM" or "HIGH" as determined at step 116, it is further determined whether the first beat delay frequency is "HIGH" and also a random number generator (which randomly generates values from "0" to "99") is currently generating a random number value not less than "20" If answered in the affirmative, the CPU 1 goes to step 119, but if answered in the negative, the CPU 1 proceeds to step 118. Thus, when the first beat delay frequency is "HIGH", an affirmative determination is yielded at this step with a probability of 80 percent.

Step 118: Now that a negative determination has been yielded at preceding step 117, it is further determined here whether the first beat delay frequency is "MEDIUM" and also the random number generator is currently generating a random number value not less than "50". If answered in the affirmative, the CPU 1 goes to step 119, but if answered in the negative, the CPU 1 proceeds to step 120 of FIG. 12. Thus, when the first beat delay frequency is "MEDIUM", an affirmative determination is yielded at this step with a probability of 50 percent.

In this way, whether or not the first beat of the phrase in question should be delayed can be decided depending on the delay frequency "HIGH" or "MEDIUM". The above-mentioned values "20" and "50" are only illustrative, and the user may of course optionally set other values for the same purpose.

Step 119: Because of an affirmative determination at preceding step 117 or 118, former and latter halves (hereinafter called a "top" and "bottom") of each beat, except for the top of the first beat, are determined randomly in order to delay the first beat of the phrase.

Step 120: Because there is no instruction to delay the phrase head as determined at step 115 and the phrase delay frequency is "NULL" as determined at step 116, or because a negative determination has been yielded at step 117 or 118, a further determination is made as to whether there is any unallocated (undetermined) beat of the preceding phrase. If answered in the affirmative, the CPU 1 goes to step 122, but if answered in the negative, the CPU 1 proceeds to step 121.

Step 121: Now that the phrase delay frequency is "NULL" as determined at step 116 and there is no unallocated beat of the preceding phrase as determined at step 120, the top of the first beat is determined as beat timing.

Step 122: Because step 120 has determined that there is some unallocated beat of the preceding phrase although the phrase delay frequency is "NULL" as determined at step 116, beat timing is randomly determined within a range from the first to fourth beats of the phrase in question including the unallocated beat.

Step 123: Now that the first syllable beat has been set in the above-mentioned manner, this step determines the last syllable beat of the phrase in correspondence with the setting of the first syllable beat. Namely, beat timing to be occupied by the last syllable beat is set in such a manner to correspond to the unallocated beat(s) in the measure in which the first syllable of the phrase resides. For example, if the initial beat timing in the measure where the first syllable resides is at the bottom of the third beat, this means that beats up to the top of the third beat are unallocated, so that the last syllable beat timing is determined to occupy up to the top of the third beat in the succeeding measure; if the initial beat timing in the measure where the first syllable resides is at the top of the third beat, this means that beats up to the bottom of the second beat are unallocated, so that the last syllable beat timing is determined to occupy up to the top of the second beat in the succeeding measure.

Step 124: The thus-determined beats of the first and last syllables are stored at the address locations of the corresponding syllable data in the words memory.

Step 125: A determination is made as to whether the stored value in the phrase number register FN has reached the last phrase number. If answered in the affirmative, the CPU 1 returns to end this beat setting process, but if the stored value of the phrase number register FN has not reached the last phrase number, the CPU 1 branches to step 126.

Step 126: Now that the stored value of the phrase number register FN has not reached the last phrase number as determined at preceding step 125, the value of the phrase number register FN is incremented by one, and the CPU 1 reverts to step 112 of FIG. 11 so as to execute the above-described beat determining process for a next phrase.

FIG. 13 shows examples of beats determined by the beat determining process. Example 1 shows a case where words data forming a phrase correspond to "/ha-ru o a i su ru/hi to wa-" of FIG. 7D, the first syllable is set as the top of the first beat by the operation of step 121, and the last syllable is set as the bottom of the fourth beat by the operation of step 123. Candidate 1 of example 2 shows a case where words data forming a phrase are "ha ru/o a i su ru/hi to wa", the first syllable is set as the bottom of the fourth beat by the operation of step 119 or 122, and the last syllable is set as the bottom of the third beat by the operation of step 123. Candidate 2 of example 2 shows a case where the first syllable is set as the bottom of the third beat by the operation of step 119 or 122, and the last syllable is set as the top of the third beat by the operation of step 123. Candidate 3 of example 2 shows a case where the first syllable is set as the top of the third beat by the operation of step 119 or 122, and the last syllable is set as the bottom of the second beat by the operation of step 123.

Figure 14:
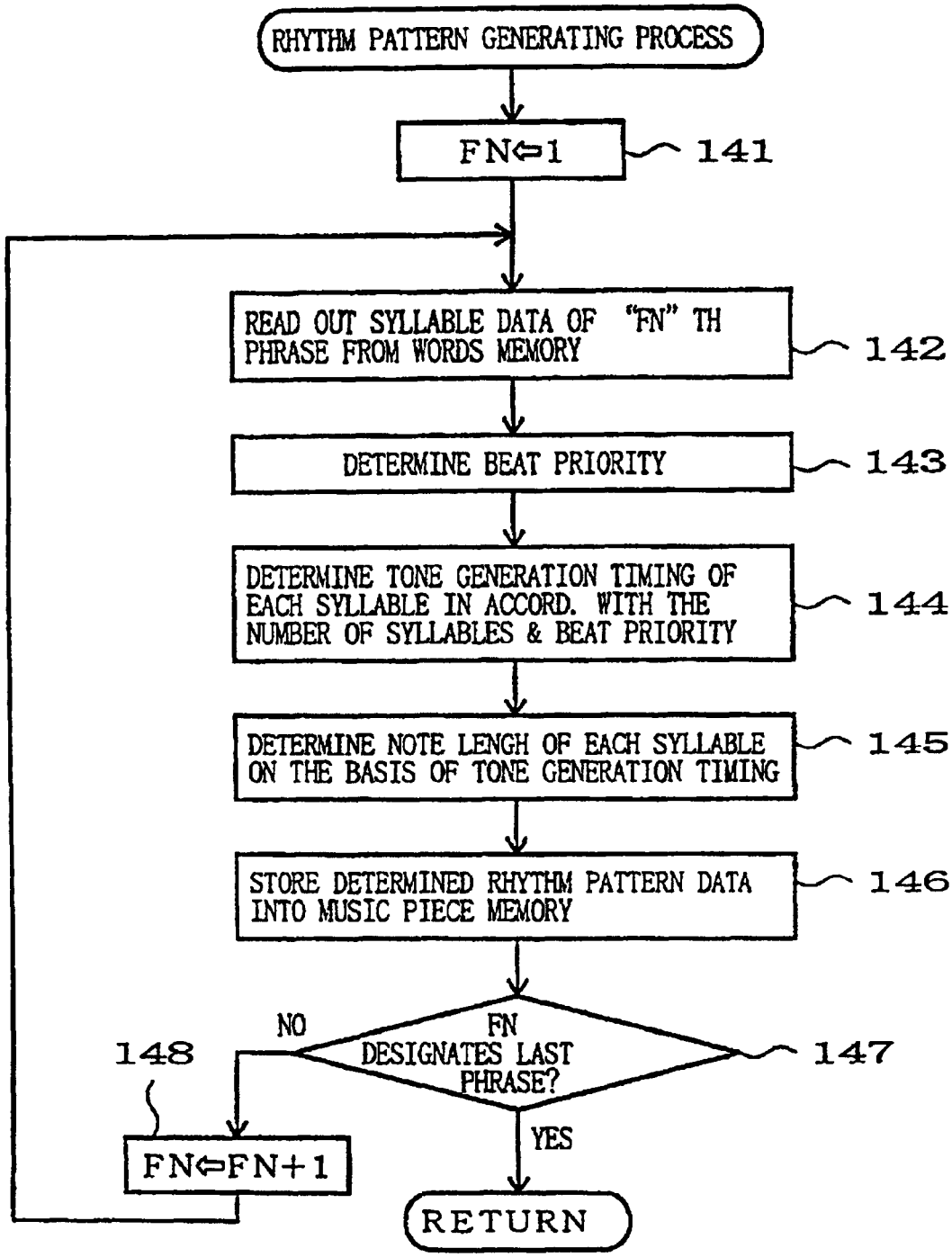
FIG. 14 is a flowchart illustrating details of a rhythm pattern generating process of FIG. 1.

Once the beats of the first and last syllables have been set in the above-mentioned manner, the CPU 1 next executes a rhythm pattern generating process of step 21. FIG. 14 shows details of the pattern generating process which is performed in the following step sequence.

Step 141: The phrase number register FN is set to a value of "1".

Step 142: From the words memory, all the words data are read out which form a phrase of the phrase number designated by the phrase number register FN.

Step 143: Priority for allocating notes, i.e., beat priority is determined on the basis of occurrence frequency at the individual tone generating timing within the phrase according to the musical conditions chosen or set as shown in FIG. 6. Namely, step 143 creates a beat priority setting table as shown in FIG. 15 and sets tone generation timing of each syllable. Specifically, occurrence frequency for frequency-related items (more-importance-to-beat, denseness/sparseness condition and contrast/imitate) is allotted to the top and bottom of beats forming each measure in the beat priority setting table. FIG. 15A shows an example of the beat priority setting table corresponding to candidate 1 of example 1 shown in FIG. 13. Because the first and last syllables of the phrase fall at the top of the first beat and the bottom of the fourth beat, respectively, and the total number of measures in the phrase is "2", the beat priority setting table is created to cover a range from the top of the first beat in the first measure to the bottom of the fourth beat in the second measure as shown in FIG. 15A.

In the "more-importance-to-beat" location or row of the beat priority setting table, there is used frequencies of weight value "1" that is preset in accordance with the genre. In FIG. 15A, the frequencies of the more-importance-to-beat are "8" at the top of the first beat, "4" at the bottom of the first beat, "6" at the top of the second beat, "2" at the bottom of the second beat, "7" at the top of the third beat, "3" at the bottom of the third beat, "5" at the top of the fourth beat, and "1" at the bottom of the fourth beat, respectively. Each of the more-importance-to-beat values at the top and bottom of the beats is multiplied by the weight value "1" and added to a total frequency. The more-importance-to-beat frequency values may be set optionally by the user.

In the "denseness/sparseness" condition row, flag values are set at the locations of the top and bottom of the beats corresponding to the denseness/sparseness chosen or set on the musical condition setting screen shown in FIG. 6. A weight value "4" is applied to the denseness/sparseness conditions. For example, because in the example of FIG. 6, the former halves of the first and second measures in passage A are set to the dense state while the latter halves of these measures are set to the sparse state, flag value "1" is set for the former halves (that is, the top and bottom of the first and second beats) of the first and second measures on the beat priority setting table. Weight value "4" is added to the total frequency values of the top and bottom of the beats for which the flag values are set. Reffering more specifically to the "denseness/sparseness" storing location in the illustration of FIG. 6, the upper of the two rows indicates whether first and second measures of each phrase are in the dense or sparse condition, and the lower row indicates whether third and fourth measures of each measure are in the dense or sparse condition. For the dense condition, an appropriate display is made to show a degree of such a dense condition in notes.

In the "contrast/imitate" row, flag values are set at the locations of the top and bottom of the beats corresponding to the rhythm pattern detected at step 37 of FIG. 3. When any passage to be imitated is designated on the musical condition setting screen shown in FIG. 6, that designated passage itself is set here. A weight value for the contrast/imitate is "4". For example, none of passages A, B and C is to be contrasted/imitated in FIG. 6, and hence flag values are set on the beat priority setting table at the locations corresponding to the rhythm pattern detected at step 37; however, no flag value is set in FIG. 15A because it corresponds to the musical condition setting screen created by the user. Thus, in the case where the musical condition setting screen is based on the analysis and extraction of an already-composed music piece or where the passage limitation is set in the "contrast/imitate" row, a flag value "1" is set at each note position of the passage to be imitated. Weight value "4" is added to the total frequency values of the top and bottom of the beats for which the flag values are set in the contrast/imitate row.

In the "total frequency" row is stored a total of the frequency values of the above-mentioned "more-importance-to-heat", "denseness/sparseness" and "contrast/imitate" rows for the top and bottom of each relevant beat. In the illustrated example, the total frequency for the top of the first beat is "12" which is a sum of "8" representing the "more-importance-to-beat" frequency value and "4" representing the "denseness/sparseness" condition. The total frequencies for the bottom of the first beat, top of the second beat, bottom of the second beat, top of the third beat, bottom of the third beat, top of the fourth beat and bottom of the fourth beat are "8", "10 ", "6", "7", "3", "5" and "1", respectively.

Finally, in a "measure-by-measure priority" row, priority numbers are allocated, in descending order of the total frequency, to the top and bottom of individual beats in each relevant measure. If the total frequency values are the same, the earlier has priority over the later. In the illustrated example of FIG. 15A, both of the first and second measures have the same priority ordering; that is, the top and bottom of the first beat has priority numbers "1" and "3", respectively, the top and bottom of the second beat have priority numbers "2" and "5", respectively, the top and bottom of the third beat have priority numbers "4" and "7", respectively, and the top and bottom of the fourth beat have priority numbers "6" and "8".

FIG. 15B shows another example of the beat priority setting table corresponding to candidate 3 of example 2 shown in FIG. 13. Because in candidate 3 of example 2, the first and last syllables of the phrase fall at the top of the third beat and bottom of the second beat, respectively, and the total number of measures in the phrase is "2", the beat priority setting table is created to cover a range from the top of the third beat in the first measure to the bottom of the second beat in the third measure as shown in FIG. 15B.

In the "more-importance-to-beat", "denseness/sparseness" and "contrast/imitate" rows, frequency values set for the top of the third beat in the first measure to the bottom of the second beat in the third measure are the same as in the above-described example of FIG. 15A. In a "measure-by-measure priority" row, priority numbers are allocated, in descending order of the total frequency, to the top and bottom of individual beats in each relevant measure. Thus, in the first measure of FIG. 15B, the top and bottom of the third beat have priority numbers "1" and "3", respectively, and the top and bottom of the fourth beat have priority numbers "2" and "4", respectively. In the second measure, the top and bottom of the first beat have priority numbers "1" and "3", respectively, the top and bottom of the second beat have priority numbers "2" and "5", respectively, the top and bottom of the third beat have priority numbers "4" and "7", respectively, and the top and bottom of the fourth beat have priority numbers "6" and "8", respectively. In the third measure, the top and bottom of the first beat have priority numbers "1" and "3", respectively, and the top and bottom of the second beat have priority numbers "2" and "4", respectively.

Step 144: Tone generation timing of each syllable is determined in accordance with the thus-created beat priority setting table and the number of syllables in the phrase in question. If the read-out words data is a long vowel mark "-", the allocation of tone generation timing is inhibited over the first to fourth sections following the syllable data immediately before the read-out mark "-", depending on the number of syllables in the phrase.

For example, according to the beat priority setting table as shown in FIG. 15A, the number of syllables in the first measure is "7", and thus tone generation timing is allocated to sections in the measure having priority numbers "1" to "7" In this case, the allocation of tone generation timing is inhibited for a single section following the syllables data "ha" immediately before the long vowel mark "-", so that tone generation timing is set to the section, except for mark "-" of priority number "3", having priority numbers "1", "2" and "4" to "8". The second measure has three syllable data and includes one long vowel mark "-", so that tone generation timing is set to the sections having priority numbers "1" to "3".

Further, according to the beat priority setting table as shown in FIG. 15B, the first measure has two syllable data and includes one long vowel mark "-", so that tone generation timing is set to the section having priority numbers "1" and "2". The second measure has five syllable data with no long vowel mark "-", so that tone generation timing is set to the sections having priority numbers "1" to "5". The third measure has three syllable data and includes one long vowel mark "-", so that tone generation timing is set to the sections having priority numbers "1" to "3".

Step 145: Note length of each syllable data is determined on the basis of the tone generation timing determined at preceding step 144. A rest is also inserted as needed. The rest inserting frequency will vary depending on which of "MELODIC" and "RHYTHMIC" is selected on the musical condition setting screen of FIG. 5.

For example, according to the beat priority setting table as shown in FIG. 15A, the first syllable "ha" in the first measure is set to the length of a quarter note while including section having no tone generation timing allocated thereto, and each of the second syllable "ru" to seventh syllable "ru" is set to the length of an eighth note. The first syllable "hi" and second syllable "to" in the second measure are both set to the length of an eighth note. The third syllable "ha" in the second measure, as combined with the sections (first to fourth sections) having no tone generation timing allocated thereto, is set to the length of a half note; this third syllable "ha" may have a variable length ranging from the quarter note length to the half note length depending on a rest inserting state.

According to the beat priority setting table as shown in FIG. 15B, the first syllable "ha" and second syllable "ru" in the first measure are both set to the length of a quarter note, each of the first syllable "o" to fourth syllable "su" in the second measure is set to the length of an eighth note, and the fifth syllable "ru" is set to the length of a quarter note; this fifth syllable "ru" may have a variable length ranging from the quarter note length to the half note length depending on a rest inserting state. The first syllable "hi" and second syllable "to" in the third measure are both set to the length of an eighth note, and the third syllable "ha" as combined with the sections (first to fourth sections) having no tone generation timing allocated thereto is set to the length of a half note; this third syllable "ha" may have a variable length ranging from the quarter note length to the dotted half note length depending on a rest inserting state.

Step 146: The rhythm pattern determined by the operation of preceding step 145 is stored into a music piece memory. That is, the note lengths of the syllable data set at step 145 are stored, as duration data, into a music piece memory area within the working memory 3. FIG. 8B shows a data storage format, in the music piece memory, of the rhythm pattern that has been set, on the basis of the words data in the words memory of FIG. 8A, according to the beat priority setting table as shown in FIG. 15A. That is, the stored contents of the words memory of FIG. 8A are converted to those of FIG. 8B through the rhythm pattern generating process of FIG. 14. The music piece memory of FIG. 8B contains the syllable data and measure line marks extracted from the words memory of FIG. 8A, as well as note lengths or duration data that have been set with respect to the extracted syllable data through the rhythm pattern generating process of FIG. 14. In practice, numerical values corresponding to the note lengths or duration are stored, although the duration data are represented in notes in FIG. 8B. Further, pitch data, velocity data, volume data, etc. are set with respect to the syllable data and stored into the music piece memory through processes as will be later described in detail.

Step 147: A determination is made as to whether the stored value in the phrase number register FN has reached the last phrase number. If answered in the affirmative, the CPU 1 returns to end this rhythm generating process, but if the stored value of the phrase number register FN has not reached the last phrase number, the CPU 1 branches to step 148.

Step 148: Now that the stored value of the phrase number register FN has not reached the last phrase number as determined at preceding step 147, the value of the phrase number register FN is incremented at one, and the CPU 1 reverts to step 142 of FIG. 14 so as to execute the above-described rhythm generating process for a next phrase.

Figure 16:
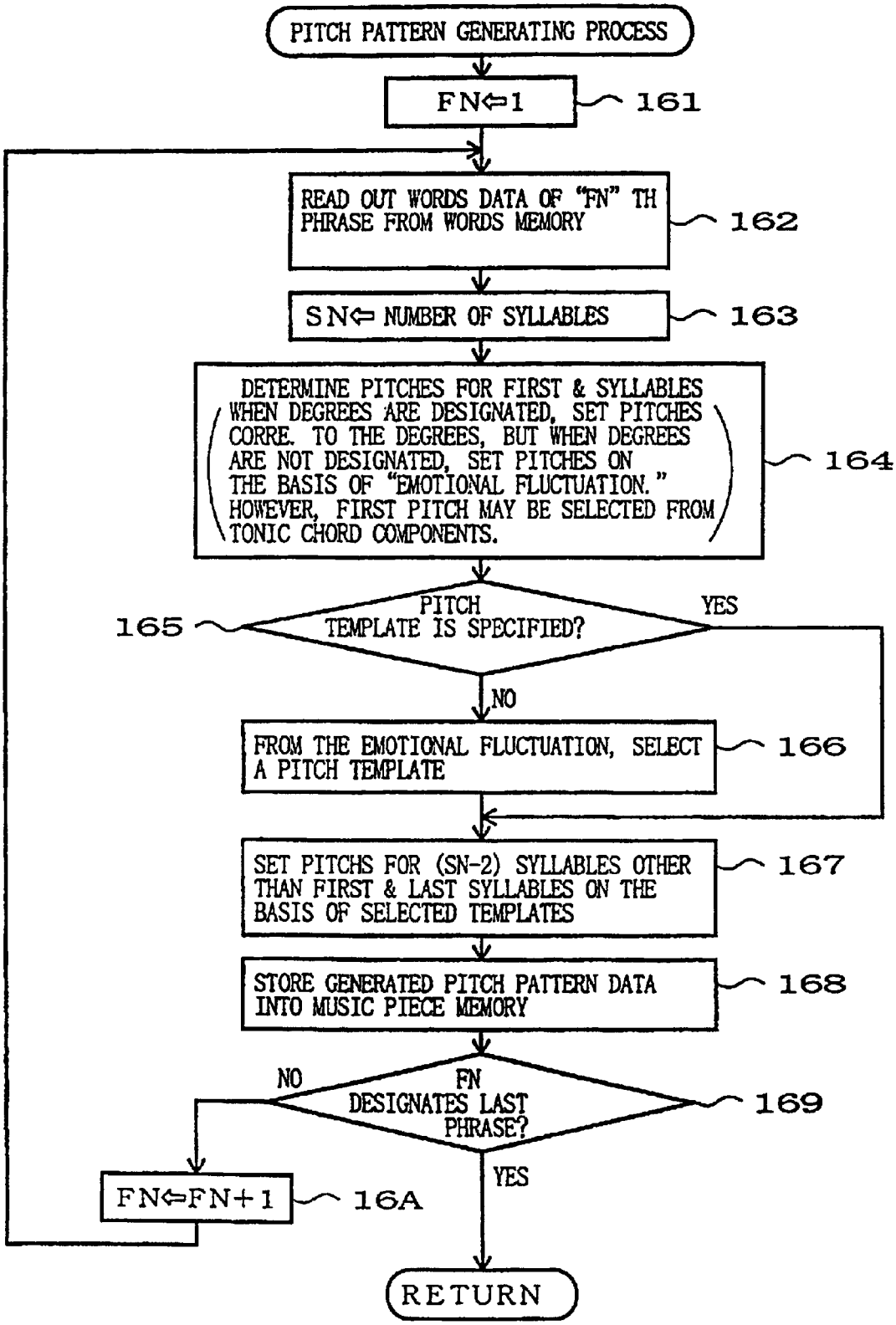
FIG. 16 is a flowchart illustrating details of a pitch pattern generating process of FIG. 1.

Once a rhythm pattern has been set in the above-mentioned manner, the CPU 1 next executes a pitch pattern generating process of step 22 of FIG. 1. FIG. 16 shows details of the pitch generating process which is performed in the following step sequence.

Step 161: The phrase number register FN is set to a value of "1".

Step 162: From the words memory, all the words data are read out which form a phrase of the phrase number designated by the phrase number register FN.

Step 163: The number of the read-out syllable data is stored into the number-of-data register SN.

Step 164: Tone pitches are determined for the first and last syllables of the phrase designated by the phrase number register FN. That is, when degrees (I, II, III, IV, V, VI, VII) are designated in the first and last tones location of the musical condition setting screen shown in FIG. 6, tone pitches corresponding to the designated degrees are determined. When such degrees are not designated in the "first and last tones" location of the musical condition setting screen, tone pitches are set on the basis of the "emotional fluctuation" location of the musical condition setting screen shown in FIG. 6. However, the first tone pitch in the music piece is selected from among tonic chord components. Although not specifically shown in the musical condition setting screen of FIG. 6, the first tone pitch in each phrase may be set on the basis of a pitch of a specific tone by designating a link with the first or last tone in the preceding phrase.

Now that tone pitches have been set at step 164 for the first and last syllables of the phrase, operations of steps 165 to 167 are performed to determine a pitch for each remaining syllable in the phrase.

Step 165: A determination is made as to whether any pitch pattern is designated in the "phrase pitch pattern" location of the musical condition setting screen shown in FIG. 6. If answered in the affirmative, the CPU 1 jumps to step 167; otherwise, the CPU 1 goes to step 166.

Figure 17:
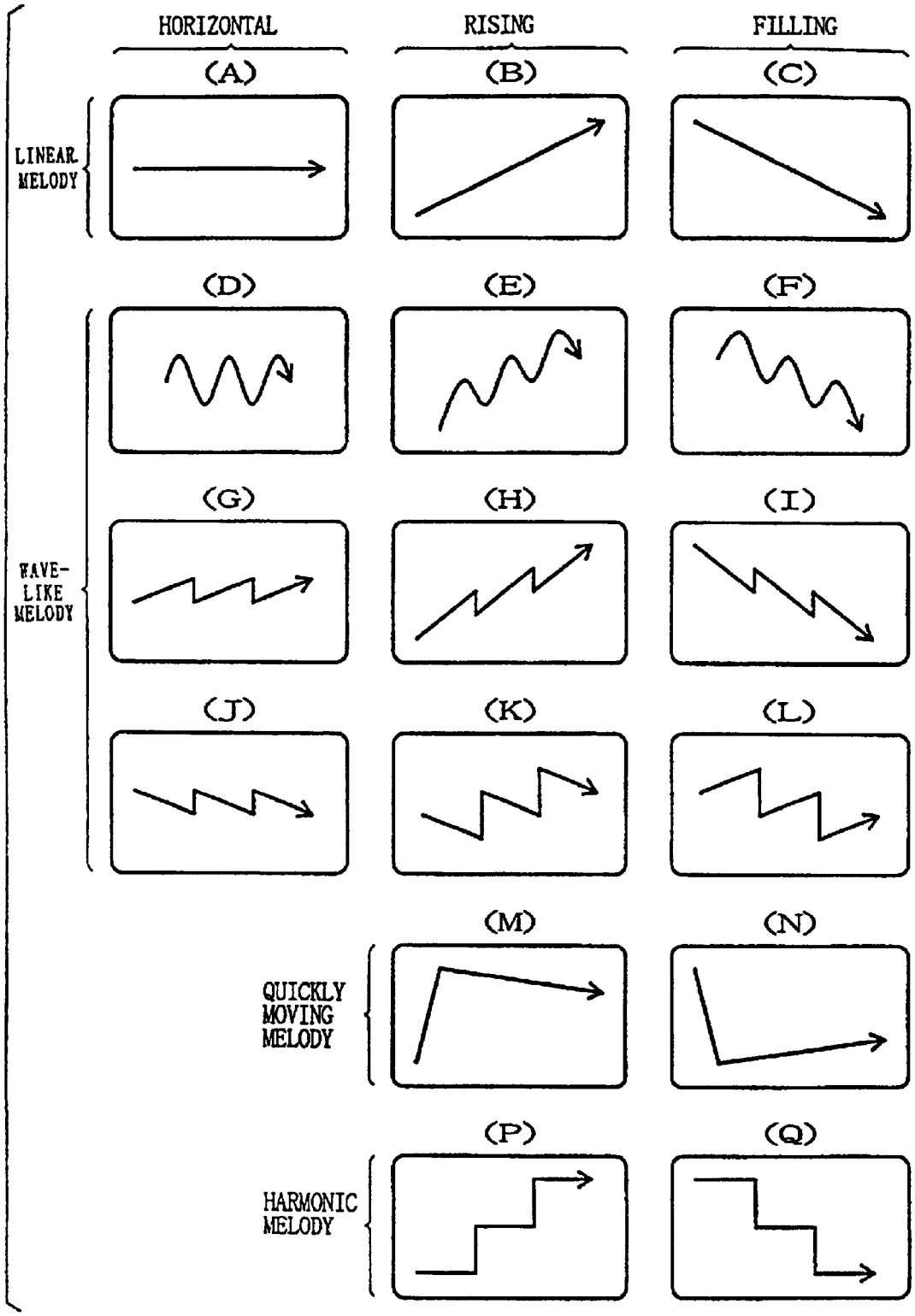
FIG. 17 shows examples of pitch patterns selected in the pitch pattern generating process detailed in FIG. 16.

Step 166: Now that no pitch pattern is designated in the phrase pitch pattern location as determined at preceding step 165, one of different pitch patterns of FIG. 17 is selected which is closest to the graphic pattern shown in the emotional fluctuation row of the musical condition setting screen shown in FIG. 6. In FIG. 17 there are a total of 16 different pitch patterns, which are classified into four major types: pitch patterns (A) to (C) represent linear melody; pitch patterns (D) to (L) represent wave-like melody; pitch patterns (M) and (N) represent quickly moving melody; and pitch patterns (P) and (Q) represent harmonic melody. Of course, various other pitch patterns may be provided. New pitch patterns may be created by sampling curves written by the user with a touch pen or the like.

Step 167: Tone pitches are set for (SN−2) syllables other than the first and last syllables on the basis of the templates selected at step 165 or 166. For example, in the case where the number of syllables is "9" and a pitch pattern as shown in FIG. 18 is specified, tone pitches set, by use of the pitch patter, for the second to eighth syllables. Because tone pitches for the first and last syllables have already been set at step 164 as degrees I and I+1, this step allocates the second to eighth syllables, other than the first and last syllables, uniformly to the pitch pattern and quantize them to the respective closest degrees so as to set a scale. Thus, in the case of FIG. 18, the second, fourth and seventh syllables are set to degree IV, the third syllable to degree V, the fifth and sixth syllables to degree III, and the eighth syllable to degree VI.

When the syllables other than the first and last are allocated uniformly on a template, they may sometimes not resemble the shape of the pitch pattern. More specifically, in such a case where the number of syllables is "6" as shown in FIG. 19, a pitch pattern as shown in (A) of FIG. 19 is specified, if the four syllables other than the first and last are allocated uniformly on the template, the allocated shape of the syllables will resemble the shape of the original template. However, where the number of syllables is "5" and the three syllables other than the first and last are allocated uniformly on the same template, the allocated shape of the syllables will not resemble the shape of the original template as shown in (B) in FIG. 19. So, in such a case, the respective allocated positions of the second and third syllables are slightly displaced forward in such a manner that the forward portion of the allocated shape resembles the corresponding portion of the template shape as detected at a curve 17C. The syllables to be thus displaced in their allocated positions and direction of the displacement may be calculated using arithmetic operations based, for example, on the least squares method.

Instead of allocating the syllables uniformly on the template, sampling may be conducted as shown in (D) of FIG. 19 in accordance with the rhythm pattern generated at step 21. Also in this case, the allocated position of any of the syllables may be displaced if the allocated shape does not resemble the original template.

Amplitude levels in the pitch pattern are set depending, for example, on the activeness/quietness pattern set in the "activeness/quietness" location of the musical condition setting screen shown in FIG. 6 or on the climax portion of the syllable data indicated in the half-tone dot mesh block of FIG. 7G. In the pitch pattern of FIG. 18, the upper amplitude dead point is degree V and the lower amplitude dead point is degree III, but if the activeness/quietness pattern represents activeness or a climax is set in that portion, the amplitude levels will increase in that portion and the upper and lower amplitude dead points will change to degrees VII and I. Conversely, if the activeness/quietness pattern represents quietness, the amplitude levels will decrease.

Referring back to FIG. 1, at step 23, velocity values are set in accordance with the accent marks "." attached to predetermined places near selected syllable data as shown in FIG. 7E, and the thus-set velocity values are reflected in the velocity of the corresponding syllable data in the music piece memory as shown in FIG. 8B. In the illustrated example of FIG. 8B, the velocity value set for each syllable data having the accent mark "." attached thereto is "5" while the velocity value set for each syllable data having no accent mark "." attached thereto is "4". Volume value is set in accordance with the emotional fluctuation curve for the whole music piece that is set via the musical condition setting screen shown in FIG. 6, and the thus-set velocity values are reflected in the velocity of the corresponding syllable data in the music piece memory as shown in FIG. 8B. In the illustrated example of FIG. 8B, the volume value set for each syllable data in accordance with the emotional fluctuation curve is "5".

Step 24 executes an operation for the user to manually modify the music piece composed by the CPU 1 through the operations of steps 19 to 23. At this step, the data of the automatically composed music piece are read out from the music piece memory and visually presented on the display 1B. Then, operations are performed to modify the rhythms and pitches within each phrase and throughout the music piece, so as to modify the music piece data as needed; for example, connections between the phrases may be modified to facilitate singing of the music piece. If a phrase is to long, a breathing pause may be inserted. Portions of the music piece where high-pitched tones last too long and where an abrupt rhythm change occurs may also be modified. The user preferably effects modifications by actually listening to the playing of the music piece to check to see whether the music piece has too many disjunct motions, has good musical consistency, etc. The music piece data having been manually modified in this way are stored back into the music piece memory.

A succession of the operations of steps 17 to 24 described above permits automatic composition of a music piece corresponding to words designated by the user.

Whereas the preferred embodiment has been described above in relation to the case where musical conditions are set by the user, an already-composed music piece may be analyzed to extract its musical conditions, or the extracted musical condition may be modified by the user.

Further, although the preferred embodiment has been described above in relation to the case where syllable data are in Japanese, it should be obvious that the present invention is also applicable to syllable data in any other languages. In such a case, syllables may be analyzed and determined, from entered words information, on the basis of phonetic symbols such as monophthong, diphthong, explosive, nasal, double consonant and fricative consonant, so that a music piece can be composed on the basis of such determined syllable information in a similar manner to the above-mentioned. In a simpler form, the user may enter the syllable information in the form of scat. For example, words as shown in FIG. 20A may be entered in scat as shown in FIG. 20B, where "D" represents each scat syllable, "-" indicates a long vowel, and "/" a phrase end or division. By thus using scat syllable information "D" and long vowel indicating information "-" to enter syllable information corresponding to desired words, the present music composing scheme should be practiced very easily even by users in non-syllabic-language spoken countries.

Furthermore, although the preferred embodiment has been described above as setting the denseness/sparseness and contrast/imitate conditions by just selecting between denseness and sparseness and whether or not to effect the contrast/imitate, such denseness/sparseness and contrast/imitate conditions may be set by designating their values. In such a case, numerical values in the denseness/sparseness and contrast/imitate rows on the beat priority setting table of FIG. 15 may be within a range from "1" to "4" corresponding to the degrees.

The first aspect of the present invention achieves the benefit that a music piece can be automatically Composed in proper consistency with already-created words.

The second aspect of the present invention achieves the benefit that when automatically composing a music piece by analyzing a melody of an original music piece, proper modifications can be made to the analyzed results so that the music piece can be automatically composed easily as contemplated by a user.

What is claimed is:

1. An automatic music composing device comprising:

supply means for supplying music template information including at least information indicative of a tendency relating to a number of notes in each of a plurality of sections forming a music piece;

input means for, in response to an operation of a user, inputting information indicative of a tendency relating to a number of notes contained in each of sections of a music piece to be composed; and determination means for determining a length and pitch of each note to be contained in each of the sections of the music piece to be composed, on the basis of said music template information supplied by said supply means and said information indicative of a tendency relating to a number of notes in each of the sections inputted by said input means.

2. An automatic music composing device as defined in claim 1 wherein said input means inputs syllable information of words to be set to the music piece to be composed.

3. An automatic music composing device as defined in claim 1 wherein said supply means includes a memory having prestored therein a plurality of pieces of the music template information for a plurality of music pieces and selection means for selecting from said memory a desired piece of the music template information.

4. An automatic music composing device as defined in claim 3 wherein said supply means further includes means for, in response to an operation of the user, changing contents of the piece of the music template information selected by said selection means.

5. An automatic music composing device as defined in claim 1 wherein said information indicative of a pitch variation tendency includes information specifying first and last tones in each of the sections, and information indicative of a pitch variation tendency between said first and last tones for each of the sections, and wherein said determination means includes means for determining a length of each note to be contained in each of the sections on the basis of said information indicative of a tendency relating to a number of notes in each of sections, and means for allocating a pitch to each said note to be contained in each of the sections on the basis of said information specifying first and last tones in each of the sections and said information indicative of a pitch variation tendency between said first and last tones.

6. An automatic music composing device as defined in claim 1 wherein said music template information includes information indicative of a note distribution tendency in each of the sections, and wherein said determination means determines the length of each note to be contained in each of the sections on the basis of said information indicative of a note distribution tendency in each of the sections and said information indicative of a tendency relating to a number of notes in each of sections.

7. An automatic music composing device as defined in claim 1 wherein each of the sections corresponds to a phrase that is comprised of a plurality of measures, and if a first note in the phrase is delayed behind first beat timing of the measure, said music template information includes delay specifying information indicative of such a delay of said first note behind said first beat timing; and wherein said determination means includes means for determining a measure-dividing position in each said phrase, means for determining first and last beat positions in each said phrase on the basis of said delay specifying information, means for determining a position and length of each note to be contained in each said phrase on the basis of the measure-dividing position and first and last beat positions determined for each said phrase, and means for determining a pitch of each note to be contained in each said phrase on the basis of said information indicative of a pitch variation tendency for each said phrase.

8. An automatic music composing device comprising:

a memory device having prestored therein a plurality of pieces of music template information for a plurality of music pieces, each of the pieces of music template information for one of the music pieces including at least information indicative of a pitch variation tendency in each of a plurality of sections forming the music piece;

a template editing device for, in response to an operation of a user, selecting from said memory device a desired one of the pieces of music template information, storing the selected piece of music template information into a buffer of said editing device, and changing contents of the stored piece of music template information in response to an operation of the user;

an input device for, in response to an operation of the user, inputting information indicative of a tendency relating to a number of notes for each of the sections of a music piece to be composed; and a note determination device for determining a length and pitch of each note to be contained in each of the sections, on the basis of said piece of music template information stored in the buffer of said template editing device and said information indicative of a tendency relating to a number of notes in each of sections inputted by said input device.

9. An automatic music composing device as defined in claim 8 which further comprises an analyzation device for analyzing musical characteristics of a given music piece and creating said music template information on the basis of the analyzed musical characteristics.

10. An automatic music composing device comprising:

an input device for inputting syllable information of words to be set to a music piece to be composed, along with information indicative of a division between said syllable information;

a device for supplying information indicative of musical characteristics of the music piece to be composed;

a device for, on the basis of said syllable information contained in a section of the words specified by said information indicative of a division, determining a number of notes to be contained in said section and a length of each of the notes; and a device for determining a pitch of each of the notes on the basis of the musical characteristics.

11. An automatic music composing device as defined in claim 10 wherein said input device inputs said syllable information in the form of scat.

12. An automatic music composing device as defined in claim 10 wherein said input device includes means for inputting words information representing the words, and means for analyzing the syllable information from the inputted words information.

13. An automatic music composing device as defined in claim 10 wherein said syllable information includes information indicating a long vowel.

14. An automatic music composing device comprising:

a memory device having prestored therein a plurality of pieces of music template information for a plurality of music pieces, each of the pieces of music template information for one of the music pieces including at least information indicative of a pitch variation tendency in each of a plurality of sections forming the music piece and information relating to a number of notes in each of the sections and a position of each of the notes;

a template editing device for, in response to an operation of an user, selecting from said memory device a desired piece of music template information, storing the selected piece of music template information into a buffer of said editing device, and changing contents of the stored piece of music template information; and a music data generation device for determining a position, length and pitch of each said note in each of the sections, on the basis of the piece of music template information stored in the buffer of said template editing device, so as to generate music data.

15. A method of automatically composing music using a computer comprising the steps of:

supplying music template information including at least information indicative of a pitch variation tendency in each of a plurality of sections forming a music piece;

inputting, in response to an operation of a user, information indicative of a tendency relating to a number of notes in each of sections of a music piece to be composed; and determining a length and pitch of each note to be contained in each of the sections, on the basis of said music template information and said information indicative of a tendency relating to a number of notes in each of sections inputted by said input means.

16. A method of automatically composing music as defined in claim 15 wherein said step of inputting inputs syllable information of words to be set to the music piece to be composed, along with information indicative of a division between said syllable information.

17. A method of automatically composing music as defined in claim 16 wherein said syllable information is inputted in the form of scat.

18. A method of automatically composing music as defined in claim 15 wherein said step of supplying includes a step of selecting, in response to an operation of the user, a desired piece of the music template information from a memory having prestored therein a plurality of pieces of the music template information for a plurality of music pieces and a step of changing contents of the selected piece of the music template information in response to an operation of the user.

19. A method of automatically composing music as defined in claim 18 which further comprises a step of analyzing musical characteristics of a given music piece, creating said music template information on the basis of the analyzed musical characteristics, and storing the created music template information into said memory.

20. A method of automatically composing music using a computer comprising the steps of:

analyzing musical characteristics for each of a plurality of sections forming a music piece and, on the basis of the analyzed musical characteristics, supplying music template information including at least information indicative of a pitch variation tendency in the section and information relating to a number of notes and a position of each said note in the section;

storing the supplied music template information into a memory, said memory storing a plurality of pieces of the music template information for a plurality of music pieces;

selecting from the memory a desired piece of the music desired template information in response to an operation of a user;

editing contents of the selected piece of the music template information in response to an operation of the user; and determining a position, length and pitch of each note to be contained in each of the sections, on the basis of the piece of the music template information selected and edited in said steps of selecting and editing, so as to generate music data.

21. A machine-readable recording medium for use in a data processing system including a CPU, said medium containing program instructions executable by said CPU for causing the data processing system to perform the steps of:

supplying music template information including at least information indicative of a pitch variation tendency in each of a plurality of sections forming a music piece;

inputting, in response to an operation of a user, information indicative of a tendency relating to a number of notes in each of sections of a music piece to be composed; and determining a length and pitch of each note to be contained in each of the sections, on the basis of said music template information and said information indicative of a tendency relating to a number of notes in each of sections.

22. A machine-readable recording medium as defined in claim 21 wherein said step of inputting inputs syllable information of words to be set to the music piece to be composed, along with information indicative of a division between said syllable information.

23. A machine-readable recording medium as defined in claim 21 wherein said step of supplying includes a step of, in response to an operation of the user, selecting a desired piece of music template information from a memory having prestored therein a plurality of pieces of music template information for a plurality of music pieces and a step of changing contents of the selected piece of music template information in response to an operation of the user.

24. A machine-readable recording medium as defined in claim 21 which further comprises instructions for causing the data processing system to perform a step of analyzing musical characteristics of a given music piece and creating said music template information on the basis of the analyzed musical characteristics.

25. A machine-readable medium for use in a data processing system including a CPU, said medium containing program instructions executable by said CPU for causing the data processing system to perform the steps of:

analyzing musical characteristics for each of a plurality of sections forming a music piece and, on the basis of the analyzed musical characteristics, supplying music template information including at least information indicative of a pitch variation tendency in the section and information relating to a number of notes and a position of each note in the section;

storing the supplied music template information into a memory, said memory storing a plurality of pieces of the music template information for a plurality of music pieces;

selecting from the memory a desired piece of the music template information in response to an operation of a user;

editing contents of the selected piece of the music template information in response to an operation of the user; and determining a position, length and pitch of each note to be contained in each of the sections, on the basis of said music template information selected and edited in said steps of selecting and editing, so as to generate music data.

26. An automatic music composing device comprising:

information supply means for supplying information including at least syllable data corresponding to words for a music piece to be composed;

setting means for setting characteristic data to characterize the music piece to be composed; and music piece generation means for generating the music piece corresponding to the words on the basis of said information including the syllable data supplied by said information supply means and said characteristic data set by said setting means.

27. An automatic music composing device as defined in claim 26 wherein said music piece generation means generates the music piece corresponding to the words by sequentially allocating note information to each syllable constituting the syllable data.

28. An automatic music composing device as defined in claim 27 wherein said note information comprises information indicative of tone generation timing and tone pitch, and said music piece generation means determines tone generation timing of each syllable data in accordance with a number of the syllables in a measure and weight of each said tone generation timing.

29. An automatic music composing device comprising:

performance data input means for inputting performance data that represents a music piece having a plurality of sections;

characteristic extraction means for analyzing said performance data for each of the sections so as to extract musical characteristics of the section, said musical characteristics including a pitch variation tendency of said section;

storage means for storing the musical characteristics of each of the sections extracted by said extraction means, as characteristic data to characterize said music piece; and music piece generation means for generating performance data representing a new music piece, on the basis of the characteristic data stored in said storage means, wherein note pitches of said performance data of said new music piece are determined on the basis of at least the pitch variation tendency information included in said characteristic data.

*30. An automatic music composing apparatus comprising:*

*an input device adapted to input words data to said apparatus; and*

*a processor coupled to said input device, the processor adapted to, on the basis of the words data inputted via said input device, produce a music piece corresponding to the inputted words data.*

*31. An automatic music composing apparatus as defined in claim 30 wherein the words data inputted via said input device include at least one factor and said processor is adapted to produce the music piece on the basis of said factor of the inputted words data.*

*32. An automatic music composing apparatus as defined in claim 31 wherein said factor is syllable data corresponding to the inputted words data.*

*33. An automatic music composing apparatus as defined in claim 32 wherein a number of notes of the music piece to be produced is determined on the basis of a number of syllable data.*

*34. An automatic music composing apparatus as defined in claim 30 wherein the words data inputted via said input device include at least one type of dividing position data indicative of any one of measure, phrase and sentence, and where for each of sections divided by the dividing position data, said processor is adapted to produces a music piece corresponding to the words data in the section.*

*35. An automatic music composing apparatus comprising:*

*an input device adapted to input words data to said apparatus;*

*a setting device adapted to set characteristics data of a music piece to be produced; and*

*a processor coupled to said input device and said setting device, the processor adapted to, on the basis of the words data inputted via said input device and the characteristics data set via said setting device, produce a music piece corresponding to the inputted words data.*

*36. An automatic music composing apparatus as defined in claim 35 wherein said characteristics data is obtained by analyzing an existing music piece.*

*37. An automatic music composing apparatus as defined in claim 35 wherein said processor is adapted to determine a rhythm corresponding to the words data in accordance with the characteristics data.*

*38. An automatic music composing apparatus as defined in claim 35 wherein said processor is adapted to determine a pitch corresponding to the words data in accordance with the characteristics data.*

*39. An automatic music composing apparatus as defined in claim 35 wherein said characteristics data is extracted by analyzing music performance data.*

*40. An automatic music composing apparatus as defined in claim 39 wherein said processor is adapted to edit the extracted characteristics data.*

*41. An automatic music composing apparatus as defined in claim 35 wherein said characteristics data can be inputted by a human operator.*

*42. An automatic music composing apparatus as defined in claim 35 wherein said characteristics data pertains to at least one of a pitch variation tendency, number of notes, concept, beat, tempo, shortest-duration note and key.*

*43. An automatic music composing apparatus comprising:*

*an input device adapted to input words data to said apparatus; and*

*a processor coupled to said input device, the processor adapted to, on the basis of the words data inputted via said input device, produce a music piece corresponding to the words data, and edit the produced music piece.*

*44. An automatic music composing apparatus comprising:*

*an input device adapted to input words data to said apparatus in correspondence with a phrase mark;*

*a setting device adapted to set characteristics data of a music piece to be produced, in correspondence with the phrase mark; and*

*a processor coupled to said input device and said setting device, the processor adapted to, on the basis of the words data inputted via said input device and the characteristics data set via said setting device, produce a music piece corresponding to the inputted words data and the phrase mark.*

*45. An automatic music composing apparatus comprising:*

*an input device adapted to input, to said apparatus, words data including a measure line mark; and*

*a processor coupled to said input device, the processor adapted to:*

*determine tone generation timing of each word, on the basis of the measure line mark included in the words data inputted via said input device; and*

*produce a music piece corresponding to the words data, using the determined tone generation timing of each word.*

*46. An automatic music composing apparatus comprising:*

*an input device adapted to input words data to said apparatus; and*

*a processor coupled to said input device, the processor adapted to:*

*determine a measure-defining position on the basis of the words data inputted via said input device;*

*determine tone generation timing of each word on the basis of the determined measure-defining position; and*

*produce a music piece corresponding to the words data, using the determined tone generation timing of each word.*

*47. An automatic music composing apparatus comprising:*

*an input device adapted to input words data including a long vowel mark; and*

*a processor coupled to said input device, the processor adapted to, on the basis of the words data inputted via said input device, produce a music piece corresponding to the inputted words data,*

*wherein no tone generation event is imparted to word data corresponding to the long vowel mark.*

*48. An automatic music composing apparatus comprising:*

*an input device adapted to input words data including an accent mark; and*

*a processor coupled to said input device, the processor adapted to, on the basis of the words data inputted via said input device, produce a music piece corresponding to the inputted words data,*

*wherein a portion of the music piece to which the accent mark is imparted is set to a pitch higher than pitches of other portions of the music piece in the neighborhood of said portion.*

*49. An automatic music composing apparatus comprising:*

*an input device adapted to input words data including an accent mark; and*

*a processor coupled to said input device, the processor adapted to, on the basis of the words data inputted via said input device, produce a music piece corresponding to the inputted words data,*

*wherein a portion of the music piece to which the accent mark is imparted is set to volume greater than volume of other portions of the music piece in the neighborhood of said portion.*

*50. An automatic music composing method comprising the steps of:*

*inputting words data; and*

*on the basis of the words data inputted via said step of inputting, producing a music piece corresponding to the words data.*

*51. A machine-readable storage medium containing a group of instructions to cause said machine to implement an automatic music composing method, said automatic music composing method comprising the steps of:*

*inputting words data; and*

*on the basis of the words data inputted via said step of inputting, producing a music piece corresponding to the words data.*

*52. An automatic music composing method comprising the steps of:*

*inputting words data;*

*setting characteristics data of a music piece to be produced; and*

*on the basis of the words data inputted via said step of inputting and the characteristics data set via said step of setting, producing a music piece corresponding to the inputted words data.*

*53. A machine-readable storage medium containing a group of instructions to cause said machine to implement an automatic music composing method, said automatic music composing method comprising the steps of:*

*inputting words data;*

*setting characteristics data of a music piece to be produced; and*

*on the basis of the words data inputted via said step of inputting and the characteristics data set via said step of setting, producing a music piece corresponding to the inputted words data.*

*54. An automatic music composing method comprising the steps of:*

*inputting words data;*

*on the basis of the words data inputted via said step of inputting, producing a music piece corresponding to the words data; and*

*editing the produced music piece.*

*55. A machine-readable storage medium containing a group of instructions to cause said machine to implement an automatic music composing method, said automatic music composing method comprising the steps of:*

*inputting words data;*

*on the basis of the words data inputted via said step of inputting, producing a music piece corresponding to the words data; and*

*editing the produced music piece.*

*56. An automatic music composing method comprising the steps of:*

*inputting words data in correspondence with a phrase mark;*

*setting characteristics data of a music piece to be produced, in correspondence with the phrase mark; and*

*on the basis of the words data inputted via said step of inputting and the characteristics data set via said step of setting, producing a music piece corresponding to the inputted words data and the phrase mark.*

*57. A machine-readable storage medium containing a group of instructions to cause said machine to implement an automatic music composing method, said automatic music composing method comprising the steps of:*

*inputting words data in correspondence with a phrase mark;*

*setting characteristics data of a music piece to be produced, in correspondence with the phrase mark; and*

*on the basis of the words data inputted via said step of inputting and the characteristics data set via said step of setting, producing a music piece corresponding to the inputted words data and the phrase mark.*

*58. An automatic music composing method comprising the steps of:*

*inputting words data including a measure line mark; and*

*determining tone generation timing of each word on the basis of the measure line mark included in the words data inputted via said step of inputting; and*

*producing a music piece corresponding to the words data, using the determined tone generation timing of each word.*

*59. A machine-readable storage medium containing a group of instructions to cause said machine to implement an automatic music composing method, said automatic music composing method comprising the steps of:*

*inputting words data including a measure line mark; and*

*determining tone generation timing of each word on the basis of the measure line mark included in the words data inputted via said step of inputting; and*

*producing a music piece corresponding to the words data, using the determined tone generation timing of each word.*

*60. An automatic music composing method comprising the steps of:*

*inputting words data; and*

*determining a measure-defining position on the basis of the words data inputted via said step of inputting;*

*determining tone generation timing of each word on the basis of the determined measure-defining position; and*

*producing a music piece corresponding to the words data, using the determined tone generation timing of each word.*

*61. A machine-readable storage medium containing a group of instructions to cause said machine to implement an automatic music composing method, said automatic music composing method comprising the steps of:*

*inputting words data; and*

*determining a measure-defining position on the basis of the words data inputted via said step of inputting;*

*determining tone generation timing of each word on the basis of the determined measure-defining position; and*

*producing a music piece corresponding to the words data, using the determined tone generation timing of each word.*

*62. An automatic music composing method comprising the steps of:*

*inputting words data including a long vowel mark; and*

*on the basis of the words data inputted via said step of inputting, producing a music piece corresponding to the inputted words data,*

*wherein no tone generation event is imparted to word data corresponding to the long vowel mark.*

*63. A machine-readable storage medium containing a group of instructions to cause said machine to implement an automatic music composing method, said automatic music composing method comprising the steps of:*

*inputting words data including a long vowel mark; and*

*on the basis of the words data inputted via said step of inputting, producing a music piece corresponding to the inputted words data,*

*wherein no tone generation event is imparted to word data corresponding to the long vowel mark.*

*64. An automatic music composing method comprising the steps of:*

*inputting words data including an accent mark; and*

*on the basis of the words data inputted via said step of inputting, producing a music piece corresponding to the inputted words data,*

*wherein a portion of the music piece to which the accent mark is imparted is set to a pitch higher than pitches of other portions of the music piece in the neighborhood of said portion.*

*65. A machine-readable storage medium containing a group of instructions to cause said machine to implement an automatic music composing method, said automatic music composing method comprising the steps of:*

*inputting words data including an accent mark; and*

*on the basis of the words data inputted via said step of inputting, producing a music piece corresponding to the inputted words data,*

*wherein a portion of the music piece to which the accent mark is imparted is set to a pitch higher than pitches of other portions of the music piece located in the neighborhood of said portion.*

*66. An automatic music composing method comprising the steps of:*

*inputting words data including an accent mark; and*

*on the basis of the words data inputted via said step of inputting, producing a music piece corresponding to the inputted words data,*

*wherein a portion of the music piece to which the accent mark is imparted is set to volume greater than volume of other portions of the music piece in the neighborhood of said portion.*

*67. A machine-readable storage medium containing a group of instructions to cause said machine to implement an automatic music composing method, said automatic music composing method comprising the steps of:*

*inputting words data including an accent mark; and*

*on the basis of the words data inputted via said step of inputting, producing a music piece corresponding to the inputted words data,*

*wherein a portion of the music piece to which the accent mark is imparted is set to volume greater than volume of other portions of the music piece in the neighborhood of said portion.*

* * * * *